(12) United States Patent
Tsuboi et al.

(10) Patent No.: US 10,064,196 B2
(45) Date of Patent: Aug. 28, 2018

(54) TERMINAL DEVICE, MONITORING METHOD, AND INTEGRATED CIRCUIT

(71) Applicant: Sharp Kabushiki Kaisha, Sakai, Osaka (JP)

(72) Inventors: Hidekazu Tsuboi, Sakai (JP); Katsunari Uemura, Sakai (JP); Yasuyuki Kato, Sakai (JP); Shohei Yamada, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/541,564

(22) PCT Filed: Dec. 28, 2015

(86) PCT No.: PCT/JP2015/086464
§ 371 (c)(1),
(2) Date: Jul. 5, 2017

(87) PCT Pub. No.: WO2016/111219
PCT Pub. Date: Jul. 14, 2016

(65) Prior Publication Data
US 2017/0347361 A1 Nov. 30, 2017

(30) Foreign Application Priority Data
Jan. 8, 2015 (JP) .................. 2015-001939

(51) Int. Cl.
*H04W 72/08* (2009.01)
*H04W 74/08* (2009.01)
*H04L 1/16* (2006.01)
*H04B 7/26* (2006.01)

(52) U.S. Cl.
CPC ............ *H04W 72/08* (2013.01); *H04L 1/16* (2013.01); *H04W 74/08* (2013.01); *H04B 7/2668* (2013.01)

(58) Field of Classification Search
CPC .......... H04W 74/0833; H04W 72/046; H04W 72/048; H04W 74/006
See application file for complete search history.

(56) References Cited

U.S. PATENT DOCUMENTS

| 2011/0075679 A1 | 3/2011 | Yui |
| 2014/0098761 A1 | 4/2014 | Lee et al. |

(Continued)

FOREIGN PATENT DOCUMENTS

| WO | 2009/157153 A1 | 12/2009 |
| WO | 2014/185676 A1 | 11/2014 |

OTHER PUBLICATIONS

3GPP TS(Technical Specification)36.3000, V11.5.0(Mar. 2013), Evolved UniversalTerrestrial Radio Access(E-UTRA) and Evolved Universal Terrestrial Radio AccessNetwork(E-UTRAN), Overall description Stage2.

(Continued)

*Primary Examiner* — Diane Mizrahi
(74) *Attorney, Agent, or Firm* — ScienBiziP, P.C.

(57) ABSTRACT

A terminal device is configured to monitor a radio link on the basis of a specific threshold value defined as a level of a downlink radio link and the threshold value is defined by taking into account the number of repetitive transmissions and/or repetitive receptions.

4 Claims, 11 Drawing Sheets

(56) References Cited

U.S. PATENT DOCUMENTS

2014/0362752 A1* 12/2014 Jha .................. H04W 36/22
                                                        370/311
2015/0189526 A1    7/2015 Yang et al.
2017/0006659 A1*  1/2017 Jha .................. H04W 36/22

OTHER PUBLICATIONS

3GPP TR(Technical Report)36.888, V12.0.0(Jun. 2013), Study on provision of low-cost Machine-Type Communications (MTC) User Equipments (UEs) based on LTE(release 12).
Ericsson, Rel-12 agreements for MTC, R1-143784, 3GPP TSG-RAN WG1 Meeting#78bis Ljubljana, Slovenia, Oct. 6-10, 2014.

* cited by examiner

TERMINAL DEVICE, MONITORING METHOD, AND INTEGRATED CIRCUIT

TECHNICAL FIELD

The present invention relates to a radio communication system, a base station device, and a terminal device, and more particularly relates to a terminal device, a monitoring method, and an integrated circuit which relate to control of data transmission and reception.

The present application claims priority based on Japanese Patent Application No. 2015-001939 filed on Jan. 8, 2015, the contents of which are incorporated herein by reference.

BACKGROUND ART

Under the 3rd Generation Partnership Project (3GPP), the W-CDMA scheme has been standardized as a third generation cellular mobile communication scheme, and is currently in service. HSDPA, which has even higher communication speeds, has also been standardized and is currently in service.

Meanwhile, under the 3GPP, the evolution of third generation radio access (Long Term Evolution: LTE or Evolved Universal Terrestrial Radio Access: EUTRA) has also been standardized, and LTE service has begun. The orthogonal frequency division multiplexing (OFDM) scheme, which is robust against multipath interference and suited for high-speed transmission, has been adopted as an LTE downlink communication scheme. Furthermore, considerations pertaining to cost and power consumption of terminal devices have led to the adoption of the discrete Fourier transform (DFT)-spread OFDM scheme based on the single-carrier frequency division multiple access (SC-FDMA) that allows for a reduction in the peak to average power ratio (PAPR) of transmit signals, as an uplink communication scheme.

Additionally, under the 3GPP, discussions about LTE-Advanced (or Advanced-EUTRA), which represents further evolution of LTE, are ongoing. In the LTE-Advanced, it is envisaged to use bands having a maximum bandwidth of up to 100 MHz for each of uplink and downlink, to carry out communication at maximum transfer rates of 1 Gbps or more for downlink, and 500 Mbps or more for uplink.

In the LTE-Advanced, it is contemplated to achieve a band of a maximum of 100 MHz by binding together multiple bands which are compatible with LTE, so as to be able to accommodate LTE terminal devices as well. Note that in the LTE-Advanced, a single LTE band of 20 MHz or narrower is called a component carrier (CC). A component carrier is also called a cell. Binding together bands of 20 MHz or narrower is termed carrier aggregation (CA) (NPL 1).

Meanwhile, in the LTE-Advanced, issues relating to lowering the cost of terminal devices that correspond to specific categories, such as machine type communication (MTC) or machine type communication (M2M), are also under examination (NPL 2). Hereinbelow, MTC/M2M terminal devices, or MTC/M2M communication devices will also be referred to as a machine type communication user equipment (MTCUE).

In order to realize low-cost MTCUE while maintaining backward compatibility with systems compliant with the LTE standard and LTE-Advanced standard, cost reduction methods have been proposed, for example, by narrowing the transmission/reception bandwidth, reducing the number of antenna ports/number of RF chains, lowering the transmission/reception data transfer rate, adopting a half-duplex frequency division duplex scheme, reducing the transmit/receive power, and extending the discontinuous reception interval. It has also been proposed that reducing the maximum bandwidth of MTCUE transmission/reception RF circuit or transmission/reception baseband circuit would be effective as a method for realizing low-cost MTCUE.

In MTC, cost reductions are not the only issue being studied, and coverage enhancement for enhancing the transmission/reception range of MTCUE is also currently a subject of study. In order to enhance coverage, it is contemplated for a base station device to repeatedly transmit downlink data or a downlink signal to MTCUE, and for MTCUE to repeatedly transmit uplink data or an uplink signal to the base station device (NPL 3).

For example, the base station device repeatedly transmits multiple times a physical broadcast channel PBCH to the MTCUE within 40 ms. Also, in a random access procedure, the MTCUE repeatedly transmits the same random access preamble, using multiple resources of a random access channel PRACH. Having received the random access preamble, the base station device repeatedly transmits a random access response message. Note that the base station device notifies MTCUE within a cell through a broadcast channel BCH, or individually notifies MTCUE, of the number of repetitions (or a parameter associated with the number of repetitions (also termed the repetition level, cell enhancement level, or the like) (NPL 3).

For example, the number of transmission repetitions of random access preamble or the number of transmission repetitions of random access response message is notified through the broadcast channel BCH. Another topic of ongoing study is how to enable MTCUE to select a single number of transmission repetitions from among multiple different numbers of transmission repetitions, where the numbers of transmission repetitions of random access preambles include multiple different numbers of transmission repetitions.

CITATION LIST

Non-Patent Document

[NON-PATENT DOCUMENT 1] NPL 1: 3GPP TS (Technical Specification) 36.300, V11.5.0 (2013-03), Evolved Universal Terrestrial Radio Access (E-UTRA) and Evolved Universal Terrestrial Radio Access Network (E-UTRAN), Overall description Stage 2

[NON-PATENT DOCUMENT 2] NPL 2: 3GPP TR (Technical Report) 36.888, V12.0.0 (2013-06), Study on provision of low-cost Machine-Type Communications (MTC) User Equipments (UEs) based on LTE (release 12)

[NON-PATENT DOCUMENT 3] NPL 3: "Rel-12 agreements for MTC", R1-143784, 3GPP TSG-RAN WG1 Meeting #78bis, Ljubljana, Slovenia, 6-10 Oct. 2014

DISCLOSURE OF THE INVENTION

Problems to be Solved by the Invention

However, with repetitive transmission (or reception) of data, when the number of repetitions is too great, each transmission/reception takes considerable time. Also, when the number of repetitions is too small, it will lead to a deterioration in transmission/reception quality. In order to make transmission/reception efficient by repetition, it is necessary to configure an optimal number of repetitions by the MTCUE or the base station device, and to manage the number of repetitions of the MTCUE or the base station device.

The present invention provides a terminal device, a monitoring method, and an integrated circuit that allow a terminal device and a base station device to efficiently perform transmission/reception by repetition.

Means for Solving the Problems (1) A terminal device according to an embodiment of the present invention is a terminal device configured with the number of repetitive transmissions and/or repetitive receptions. The terminal device includes a physical layer control part configured to monitor a radio link on the basis of a specific threshold value defined as a level of a downlink radio link. The threshold value is defined by taking into account the number of repetitive transmissions and/or repetitive receptions.

(2) Further, a control method according to the embodiment of the present invention is a monitoring method applied to a terminal device configured with the number of repetitive transmissions and/or repetitive receptions. The method includes at least the step of monitoring a radio link on the basis of a specific threshold value defined as a level of a downlink radio link. The threshold value is defined by taking into account the number of repetitive transmissions and/or repetitive receptions.

(3) Further, an integrated circuit according to the embodiment of the present invention is an integrated circuit mounted in a terminal device configured with the number of repetitive transmissions and/or repetitive receptions. The integrated circuit causes the terminal device to exert the function of monitoring a radio link on the basis of a specific threshold value defined as a level of a downlink radio link. The threshold value is defined by taking into account the number of repetitive transmissions and/or repetitive receptions.

Effects of the Invention

As described above, according to the embodiments of the present invention, there can be provided a terminal device, a monitoring method, and an integrated circuit that allow a terminal device to efficiently perform repeated transmission/reception control, and allow a base station device to efficiently perform data scheduling with respect to a terminal device.

MODE FOR CARRYING OUT THE INVENTION

An OFDM scheme is employed for downlink in the LTE. Furthermore, a single carrier communication scheme based on a DFT-spread OFDM scheme is employed for uplink in the LTE.

Figure 6:
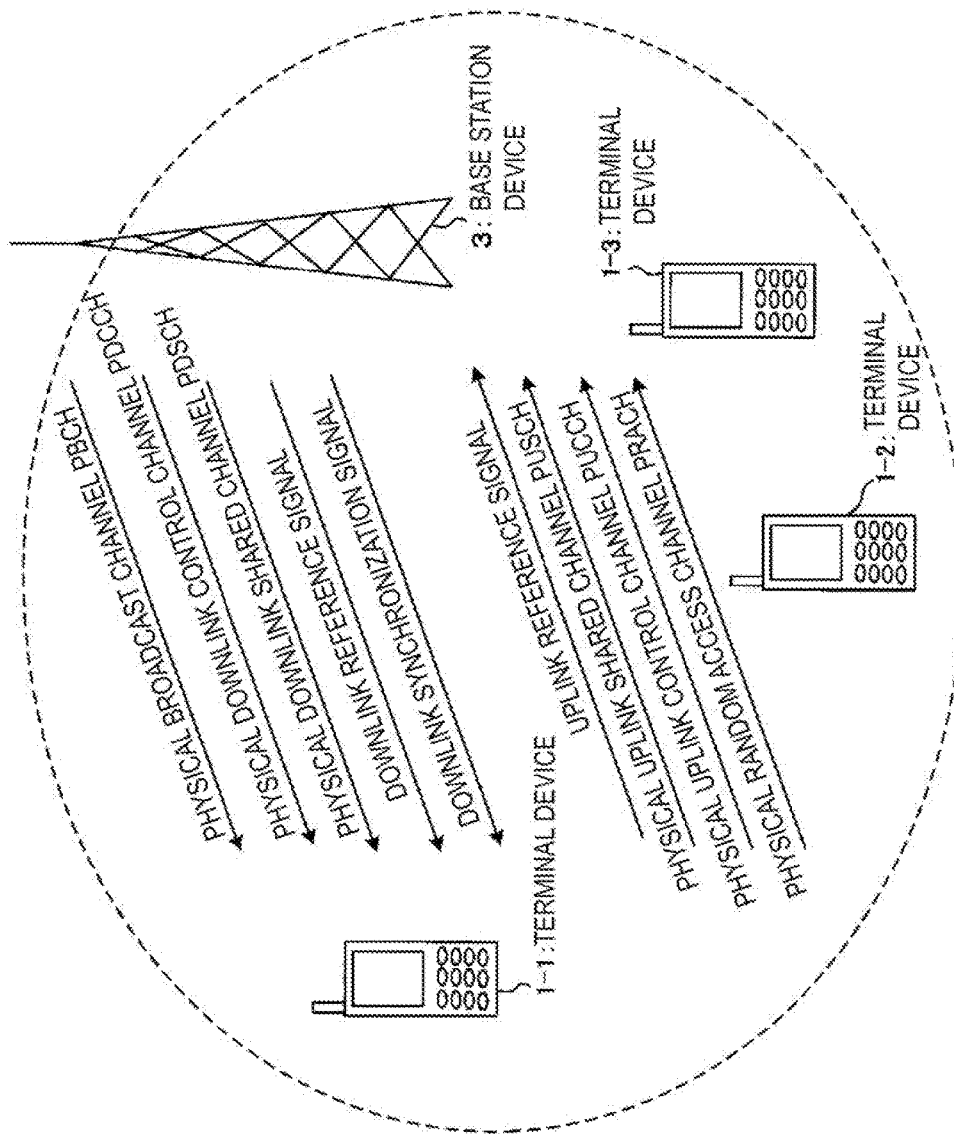
FIG. 6 is a diagram illustrating an example of a physical channel configuration in an LTE.

FIG. 6 is a diagram illustrating an LTE physical channel configuration. A downlink physical channel is constituted of a physical downlink shared channel (PDSCH), a physical downlink control channel (PDCCH), and a physical broadcast channel (PBCH). Additionally, physical signals such as a downlink synchronization signal and a downlink reference signal are provided (NPL 1).

An uplink physical channel is constituted of a physical random access channel (PRACH), a physical uplink shared channel (PUSCH), and a physical uplink control channel (PUCCH). Additionally, physical signals such as an uplink reference signal are provided. The uplink reference signal includes a demodulation reference signal (DRS) and a sounding reference signal (SRS). Furthermore, the sounding reference signal includes a periodic SRS and an aperiodic SRS. Hereinafter, unless otherwise indicated, the sounding reference signal refers to the periodic SRS (NPL 1).

Figure 7:
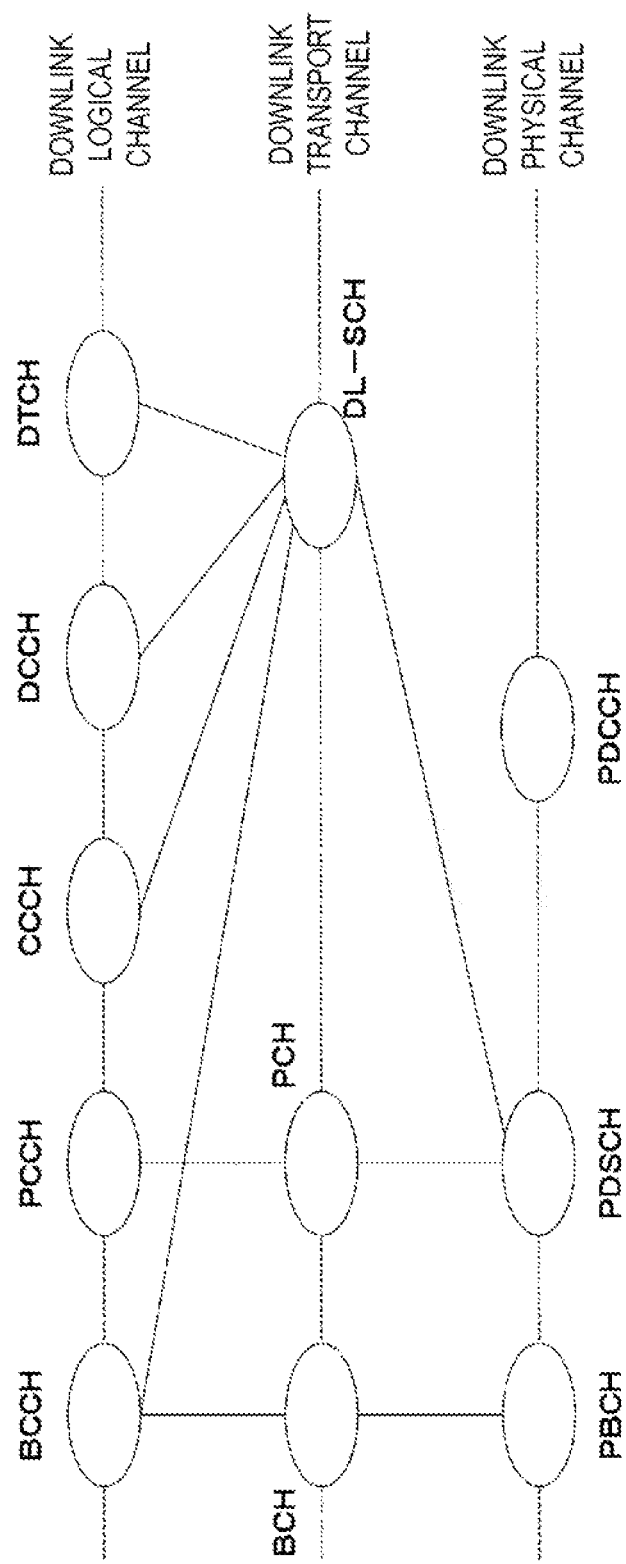
FIG. 7 is a diagram illustrating an example of a downlink channel configuration in the LTE.

FIG. 7 is a diagram illustrating an LTE downlink channel configuration. The downlink channel illustrated in FIG. 7 is constituted of a logical channel, a transport channel, and a physical channel. The logical channel defines types of transfer services of data to be transmitted/received in a medium access control (MAC) layer. The transport channel defines what characteristics data to be transmitted over a radio interface has, and how the data is transmitted. The physical channel is configured to carry data transported to the physical layer by the transport channel.

The downlink logical channel includes a broadcast control channel (BCCH), a paging control channel (PCCH), a common control channel (CCCH), a dedicated control channel (DCCH), and a dedicated traffic channel (DTCH).

The downlink transport channel includes a broadcast channel (BCH), a paging channel (PCH), and a downlink shared channel (DL-SCH).

The downlink physical channel includes the physical broadcast channel (PBCH), the physical downlink control channel (PDCCH), and the physical downlink shared channel (PDSCH). These channels are transmitted/received between the base station device and the terminal device.

Next, the logical channel will be described. The broadcast control channel BCCH is a downlink channel used to broadcast system control information. The paging control channel PCHH is a downlink channel used to transmit paging information, and is used when the network does not know the cell position of a terminal device. The common control channel CCCH is a channel used to transmit control information between terminal devices and a network, and is used by terminal devices that do not have a radio resource control (RRC) connection to the network.

The dedicated control channel DCCH is a point-to-point bidirectional channel, and is utilized to transmit individual pieces of control information between terminal devices and a network. The dedicated control channel DCCH is used by terminal devices that have an RRC connection. The dedicated traffic channel DTCH is a point-to-point bidirectional channel dedicated to one terminal device, and is utilized to transfer user information (unicast data).

Next, the transport channel will be described. The broadcast channel BCH is broadcast to the entire cell in accordance with a transmission format that is fixedly defined beforehand. The downlink shared channel DL-SCH supports hybrid automatic repeat request (HARQ), dynamic adaptation radio link control, and discontinuous reception (DRX), and needs to be broadcast to the entire cell.

The paging channel PCH supports the DRX, and needs to be broadcast to the entire cell. Additionally, the paging channel PCH is mapped to a physical resource, i.e., the physical downlink shared channel PDSCH which is used dynamically with respect to the traffic channels and other control channels.

Next, the physical channel will be described. The physical broadcast channel PBCH has the broadcast channel BCH mapped thereto at 40 ms intervals. The physical downlink control channel PDCCH is a channel used to notify a terminal device of a radio resource assignment of the downlink shared channel PDSCH (downlink assignment), hybrid automatic repeat request (HARQ) information on downlink data, and uplink transmission permission (uplink grant) that corresponds to a radio resource assignment of the physical uplink shared channel PUSCH. The physical downlink shared channel PDSCH is a channel used to transmit downlink data or paging information.

Note that the physical downlink control channel PDCCH occupies the first to third OFDM symbols of a resource block in one subframe, and the downlink shared channel PDSCH occupies the remaining OFDM symbols. One subframe is constituted of two resource blocks, and one frame is constituted of 10 subframes. One resource block is constituted of 12 subcarriers and 7 OFDM symbols.

When the base station device has notified the terminal device of a radio resource assignment of a physical downlink shared channel PDSCH to the terminal device on the physical downlink control channel PDCCH, a region of the physical downlink shared channel PDSCH assigned to the terminal device is a physical downlink shared channel PDSCH within the same subframe of the physical downlink control channel PDCCH on which the terminal device has been notified of the downlink assignment.

Next, channel mapping will be described. As illustrated in FIG. 7, in the downlink, mapping between the transport channel and the physical channel takes place as follows. The broadcast channel BCH is mapped to the physical broadcast channel PBCH. The paging channel PCH and the downlink shared channel DL-SCH are mapped to the physical downlink shared channel PDSCH. The physical downlink control channel PDCCH is used as an independent physical channel.

Additionally, in the downlink, mapping between the logical channel and the transport channel takes place as follows. The paging control channel PCCH is mapped to the paging channel PCH. The broadcast control channel BCCH is mapped to the broadcast channel BCH and the downlink shared channel DL-SCH. The common control channel CCCH, the dedicated control channel DCCH, and the dedicated traffic channel DTCH are mapped to the downlink shared channel DL-SCH.

Figure 8:
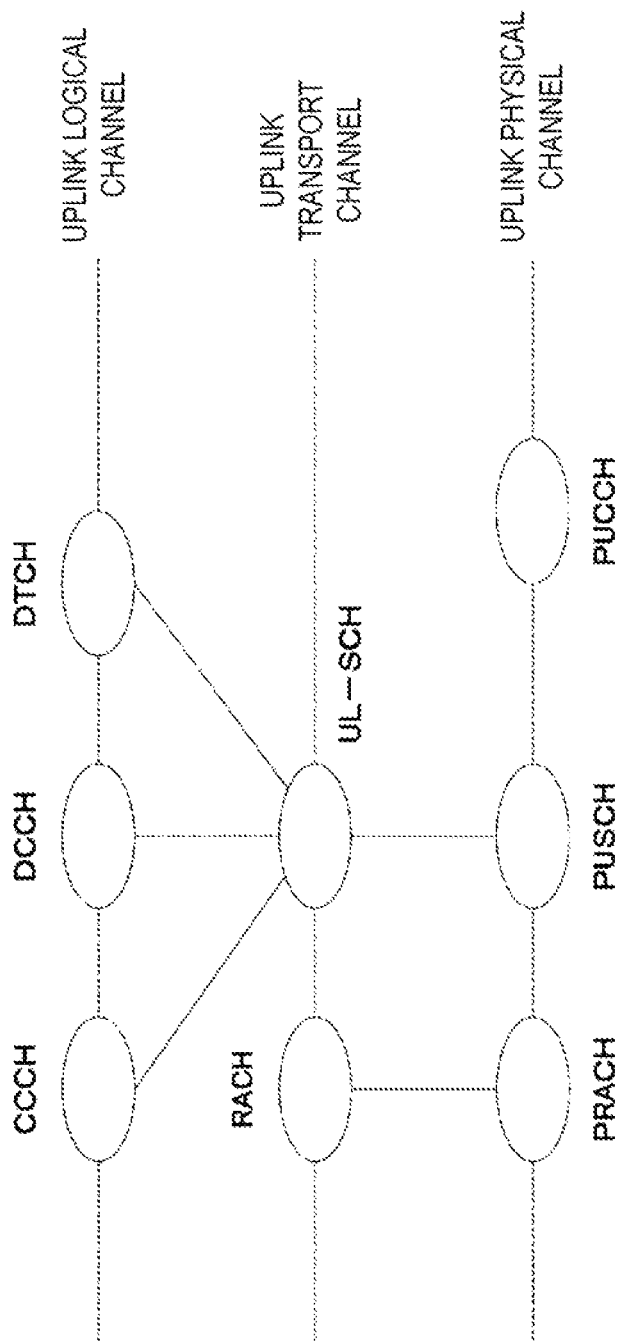
FIG. 8 is a diagram illustrating an example of an uplink channel configuration in the LTE.

FIG. 8 is a diagram illustrating an LTE uplink channel configuration. The uplink channel illustrated in FIG. 8 is constituted of a logical channel, a transport channel, and a physical channel. The channels are defined in the same manner as the downlink channels.

The uplink logical channel includes a common control channel (CCCH), a dedicated control channel (DCCH), and a dedicated traffic channel (DTCH).

The uplink transport channel includes an uplink shared channel (UL-SCH) and a random access channel (RACH).

The uplink physical channel includes a physical uplink control channel (PUCCH), a physical uplink shared channel (PUSCH), and a physical random access channel (PRACH). These channels are transmitted/received between the base station device and the terminal device.

Next, the logical channel will be described. The common control channel CCCH is a channel used to transmit control information between terminal devices and a network, and is used by a terminal device or base station device when the terminal device has not moved to a state of having a radio resource control (RRC) connection with the network (RRC connected state, RRC_CONNECTED).

The dedicated control channel DCCH is a point-to-point bidirectional channel, and is utilized to transmit individual pieces of control information between terminal devices and a network. The dedicated control channel DCCH is used by terminal devices that have an RRC connection. The dedicated traffic channel DTCH is a point-to-point bidirectional channel dedicated to one terminal device, and is utilized to transfer user information (unicast data).

Next, the transport channel will be described. The uplink shared channel UL-SCH supports hybrid automatic repeat request (HARQ), dynamic adaptation radio link control, and discontinuous transmission (DTX). On the random access channel RACH, limited control information is transmitted.

Next, the physical channel will be described. The physical uplink control channel PUCCH is a channel used to notify the base station device of response information (acknowledge (ACK)/negative acknowledge (NACK)) on downlink data, downlink radio quality information, and an uplink data transmission request (scheduling request: SR). The physical uplink shared channel PUSCH is a channel used to transmit uplink data. The physical random access channel PRACH is used primarily for random access preamble transmission, in order to acquire information about transmission timing from the terminal device to the base station device. The random access preamble transmission takes place during the random access procedure.

Next, channel mapping will be described. As illustrated in FIG. 8, in the uplink, mapping between the transport channel and the physical channel takes place as follows. The uplink shared channel UL-SCH is mapped to the physical uplink shared channel PUSCH. The random access channel RACH is mapped to the physical random access channel PRACH. The physical uplink control channel PUCCH is used as an independent physical channel.

Additionally, in the uplink, mapping between the logical channel and the transport channel takes place as follows.

The common control channel CCCH, the dedicated control channel DCCH, and the dedicated traffic channel DTCH are mapped to the uplink shared channel UL-SCH.

Figure 9:
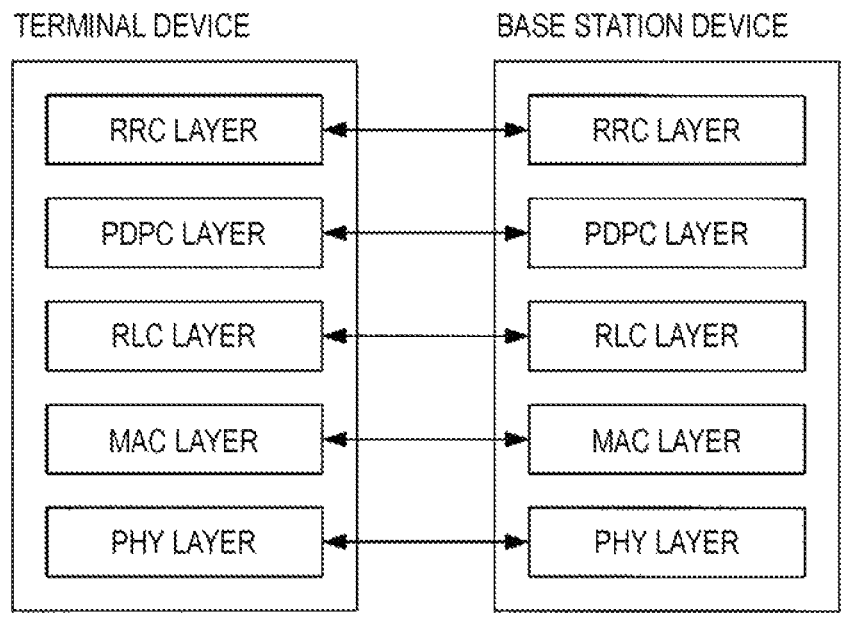
FIG. 9 is a diagram illustrating a configuration example of a communication protocol relating to control information of the base station device and the terminal device.
Figure 10:
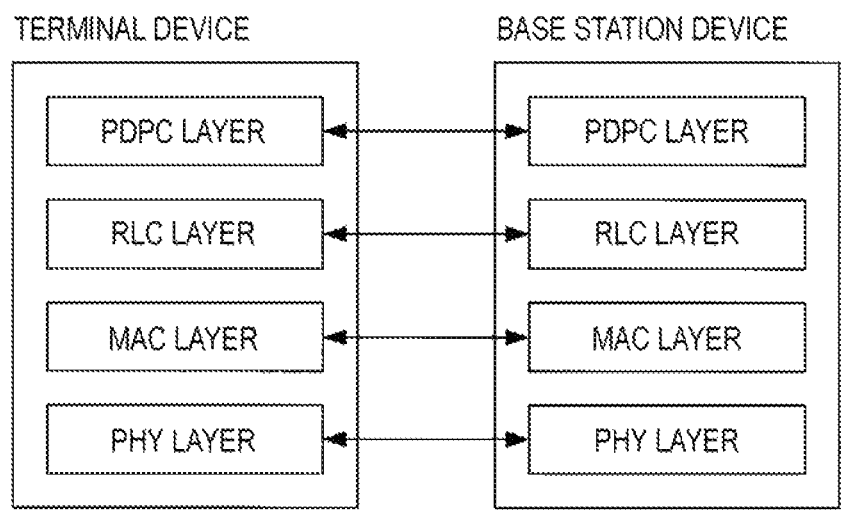
FIG. 10 is a diagram illustrating a configuration example of a communication protocol relating to user information of the base station device and the terminal device.

FIG. 9 illustrates a protocol stack for handling control data of an LTE terminal device and base station device. FIG. 10 illustrates a protocol stack for handling user data of the LTE terminal device and base station device. FIG. 9 and FIG. 10 will be described below.

The physical layer (PHY layer) provides a transfer service to a higher layer. The PHY layer is connected to an upper medium access control layer (MAC layer) via the transport channel. Data moves between the MAC layer and the PHY layer via the transport channel. Between the PHY layers of the terminal device and base station device, data is transmitted/received via the physical channel.

The MAC layer causes various logical channels to be mapped to various transport channels. The MAC layer is connected to an upper radio link control layer (RLC layer) via the logical channels. The logical channels are broadly classified into a control channel for transferring control information and a traffic channel for transferring user data, in accordance with the type of information transferred thereon. The MAC layer is capable of controlling the PHY layer for discontinuous reception/transmission (DRX/DTX), providing notification of information on transmit power, carrying out HARQ control, and the like.

The MAC layer is also capable of providing notification of the amount of data in a transmission buffer that corresponds to each of the logical channels (buffer status report: BSR), and carrying out a radio resource request for transmission of uplink data (scheduling request). The MAC layer executes a random access procedure for initial access, a scheduling request, or the like.

The MAC layer is also capable of, when the carrier aggregation is enabled, controlling the PHY layer for activation/deactivation of a cell and controlling the PHY layer for management of the uplink transmission timing.

The RLC layer performs segmentation and concatenation of data received from a higher layer, and adjusts the data size to one such that a lower layer can transmit the data appropriately. The RLC layer is also capable of ensuring quality of service (QoS) required of each piece of data. That is, the RLC layer is capable of data re-transmission control and the like.

The packet data convergence protocol layer (PDCP layer) has a header compression function of compressing unneeded control information in order to achieve efficient transfer of IP packets, namely user data, in radio sections. The PDCP layer is also capable of encoding data.

In the radio resource control layer (RRC layer), only control information is defined. The RRC layer configures/re-configures radio bearers (RBs), and controls the logical channels, transport channels, and physical channels. The RBs are classified into a signaling radio bearer (SRB) and a data radio bearer (DRB). The SRB is utilized as a transmission path for a RRC message that is control information. The DRB is utilized as a transmission path for user information. Each of the RBs is configured between the respective RRC layers of the base station device and the terminal device.

Note that the PHY layer corresponds to the physical layer that is Layer 1 of the hierarchical structure of the widely-known open systems interconnection (OSI) model; the MAC layer, the RLC layer, and the PDCP layer correspond to the data link layer that is Layer 2 of the OSI model; and the RRC layer corresponds to the network layer that is Layer 3 of the OSI model.

Next, the random access procedure will be described. The random access procedure includes two access procedures: a contention based random access procedure, and a non-contention based random access procedure (NPL 1).

Figure 11:
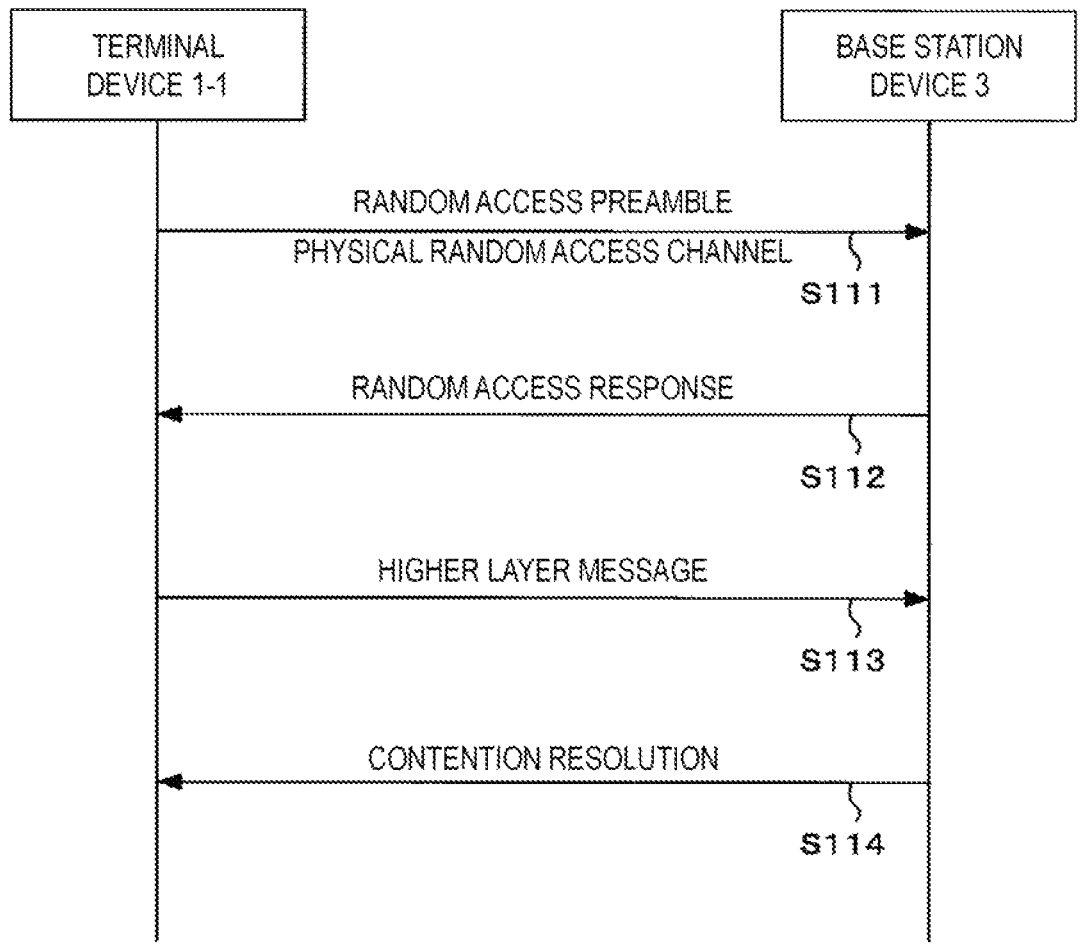
FIG. 11 is a diagram illustrating a contention based random access procedure.

FIG. 11 is a diagram illustrating the contention based random access procedure. The contention based random access procedure involves random access that may cause contention (collision) between terminal devices. The contention based random access procedure is used: at the time of initial access with no connection (communication) established with the base station device; for making a scheduling request when uplink data transmission has occurred in the terminal device with a connection established with the base station device but with uplink synchronization lost; or the like.

Figure 12:
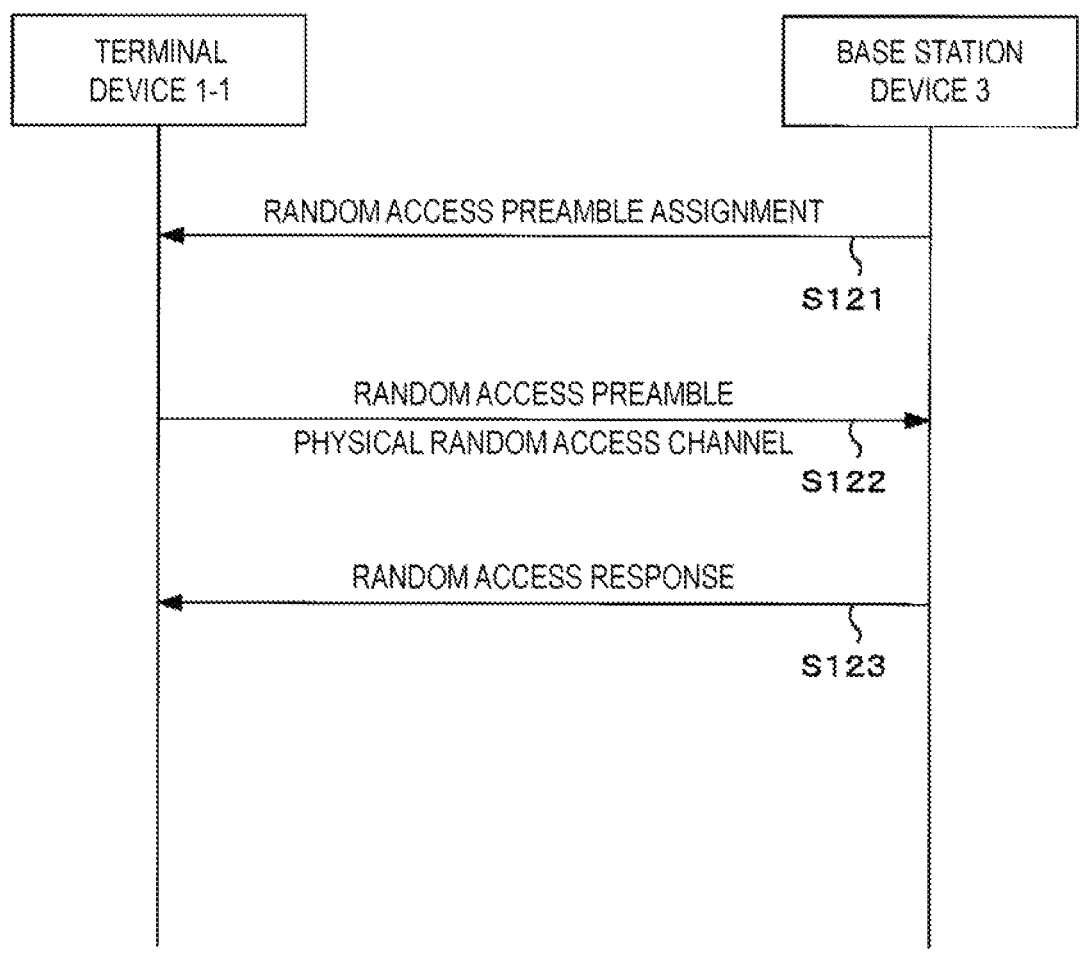
FIG. 12 is a diagram illustrating a non-contention based random access procedure.

FIG. 12 is a diagram illustrating a non-contention based random access procedure. The non-contention based random access procedure involves random access that causes no contention between terminal devices, and is used to rapidly achieve uplink synchronization between the terminal device and the base station device when the terminal device and the base station device are connected but uplink synchronization is lost. In the non-contention based random access procedure, the terminal device is instructed by the base station device to initiate random access, for example, during handover, when the transmission timing of the terminal device is invalid, or other exceptional cases (NPL 1). The non-contention based random access procedure is instructed by the radio resource control (RRC, Layer 3) layer message and control data on the downlink control channel PDCCH.

The contention based random access procedure will be briefly described with reference to FIG. 11. First, a terminal device 1-1 transmits a random access preamble to a base station device 3 (message 1: (1), step S111). Having received the random access preamble, the base station device 3 transmits a response to the random access preamble (a random access response message) to the terminal device 1-1 (message 2: (2), step S112). On the basis of scheduling information included in the random access response, the terminal device 1-1 transmits a higher layer (Layer 2/Layer 3) message (message 3: (3), step S113). The base station device 3 transmits a contention resolution message to the terminal device 1-1 from which the base station device 3 has successfully received the higher layer message of (3) (message 4: (4), step S114). Note that the contention based random access is also called random preamble transmission.

The non-contention based random access procedure will be briefly described with reference to FIG. 12. First, the base station device 3 notifies the terminal device 1-1 of a preamble number (or a sequence number), and a random access channel number to be used (message 0: (1'), step S121). The terminal device 1-1 transmits the random access preamble corresponding to the specified preamble number to the specified random access channel RACH (message 1: (2'), step S122). Having received the random access preamble, the base station device 3 transmits a response to the random access preamble (a random access response message) to the terminal device 1-1 (message 2: (3'), step S123). However, when the preamble number notified in step S121 is zero, the contention based random access procedure is performed. Note that the non-contention based random access is also called dedicated preamble transmission.

The connection procedure to the base station device 3 by the terminal device 1-1 will be described with reference to FIG. 11. First, the terminal device 1-1 acquires system information on the base station device 3 via the physical broadcast channel PBCH or the like, executes a random access procedure in accordance with random access-related information included in the system information, and connects to the base station device 3. From the random access-related information in the system information and the like, the terminal device 1-1 generates a random access preamble. The terminal device 1-1 then transmits the random access preamble on the random access channel RACH (message 1: (1)).

Upon detecting the random access preamble from the terminal device 1-1, the base station device 3 calculates, from the random access preamble, the amount of deviation of transmission timing between the terminal device 1-1 and the base station device 3, performs scheduling for transmitting a Layer 2 (L2)/Layer 3 (L3) message (specifying an uplink radio resource position (position of the uplink shared channel PUSCH), a transmission format (message size), and the like), assigns a cell-radio network temporary identity (temporary C-RNTI: terminal device identification information), maps, on the physical downlink control channel PDCCH, a random access-radio network temporary identity (RA-RNTI, random access response identification information) indicating a response (random access response) addressed to the terminal device 1-1 that has transmitted the random access preamble of the random access channel RACH, and transmits on the physical downlink shared channel PDSCH a random access response message that includes transmission timing information, scheduling information, the temporary C-RNTI, and the received random access preamble information (message 2: (2)).

Upon detecting that the presence of the RA-RNTI on the physical downlink control channel PDCCH, the terminal device 1-1 checks the content of the random access response message mapped on the physical downlink shared channel PDSCH, and when the transmitted random access preamble information has been found therein, adjusts the uplink transmission timing on the basis of the transmission timing information, and transmits an L2/L3 message that includes information identifying the terminal device 1-1, such as a C-RNTI (or temporary C-RNTI), an international mobile subscriber identity (IMSI), or the like, using the scheduled radio resource and transmission format (message 3: (3)).

When the transmission timing has been adjusted, the terminal device 1-1 starts a transmission timing timer. While the transmission timer is in operation (running), the transmission timing is valid, and when the transmission timing timer expires or stops, the transmission timing is invalid. When the transmission timing is valid, the terminal device 1-1 is allowed to transmit data to the base station device 3, whereas when the transmission timing is invalid, the terminal device 1-1 is allowed to transmit only a random access preamble. Furthermore, a period during which the transmission timing is valid is called an uplink synchronous state, and a period during which the transmission timing is invalid is called an uplink asynchronous state.

Upon receiving the L2/L3 message from the terminal device 1-1, the base station device 3, using the C-RNTI (or temporary C-RNTI) or the IMSI included in the received L2/L3 message, transmits to the terminal device 1-1 a contention resolution message for determining whether contention (collision) is occurring among the terminal devices 1-1 to 1-3 (message 4: (4)).

Note that upon having not detected a random access response message that includes a preamble number corresponding to the transmitted random access preamble within a specified period of time, upon having failed to transmit the message 3, or upon having not detected identification information on the terminal device 1-1 in the contention resolution message within a specified period of time, the terminal device 1-1 starts the process over from transmission of a random access preamble (message 1: (1)).

Then, when the number of random access preamble transmissions has exceeded the maximum number of random access preamble transmissions indicated by the system information, the terminal device 1-1 determines that a problem has occurred with random access, and notifies the RRC layer of the existence of the problem with random access. In accordance with an instruction from the RRC layer or the MAC layer, the terminal device 1-1 terminates the random access procedure. Note that upon successful completion of the random access procedure, control data for connection is further exchanged between the base station device 3 and the terminal device 1-1. At this time, the base station device 3 notifies the terminal device 1-1 of an individually-assigned uplink reference signal, or assignment information on the physical uplink control channel PUCCH.

To update an uplink transmission timing applied after the completion of the random access procedure, the base station device 3 measures an uplink reference signal (a measurement reference signal or demodulation reference signal) transmitted from the terminal device 1-1, calculates the uplink transmission timing, and notifies the terminal device 1-1 of a transmission timing message that includes the calculated transmission timing information.

Upon updating the transmission timing indicated in the transmission timing message notified by the base station device 3, the terminal device 1-1 restarts the transmission timing timer. Note that the base station device 3 also retains the same transmission timing timer as that of the terminal device 1-1, and starts or restarts the transmission timing timer upon transmitting transmission timing information. This configuration allows the base station device 3 and the terminal device 1-1 to manage an uplink synchronous state. Note that when the transmission timing timer has expired, or when the transmission timing timer is not in operation, the transmission timing is invalid.

In the 3GPP, the LTE-Advanced, which is a further evolution of LTE, is also under discussion. In the LTE-Advanced, it is envisaged to use bands having a maximum bandwidth of up to 100 MHz for each of uplink and downlink, to perform communication at maximum transfer rates of 1 Gbps or more for downlink, and 500 Mbps or more for uplink.

In the LTE-Advanced, it is contemplated to achieve a band of a maximum of 100 MHz by binding together multiple LTE bands of 20 MHz or narrower, so as to be able to accommodate LTE terminal devices as well. Note that for the LTE-Advanced, a single LTE band of 20 MHz or narrower is called a component carrier (CC) (NPL 1).

In addition, a single downlink component carrier and a single uplink component carrier are combined to constitute a single cell. Note that a single cell can also be constituted of a single downlink component carrier only. Communications between the base station device and the terminal device via aggregated multiple cells are termed carrier aggregation.

In carrier aggregation, a single base station device assigns multiple cells that match the communication capabilities and communication conditions of the terminal device, and carrying out communication with the terminal device via the assigned multiple cells. Note that one of the multiple cells assigned to the terminal device is defined as a first cell (primary cell (PCell)), and the other cells are defined as second cells (secondary cells (SCells)). The primary cell is assigned with functions, such as assignment of the physical uplink control channel PUCCH, that are not performed in the secondary cells.

In addition, for the LTE-Advanced, issues relating to lowering the cost of terminal devices that support machine type communication (MTC) or machine type communication (M2M) are under examination (NPL 2). Hereinbelow, an MTC/M2M terminal device or an MTC/M2M communication devices will also be referred to as machine type communication user equipment (MTCUE).

In order to realize low-cost MTCUE while maintaining backward compatibility with systems compliant with the LTE standard and LTE-Advanced standard, cost reduction methods have been proposed, such as narrowing the transmission/reception bandwidth, reducing the number of antenna ports/number of RF chains, lowering the transmission/reception data transfer rate, adopting the half-duplex frequency division duplex scheme, reducing the transmit/receive power, and extending the discontinuous reception interval. It has also been proposed that reducing the maximum bandwidth of MTCUE transmission/reception RF circuit or transmission/reception baseband circuit would be effective as a method for realizing low-cost MTCUE.

Of issues under study in relation to MTC, cost reductions are not the only issue being studied, and coverage enhancement (CE) for enhancing the transmission/reception range of MTCUE is also currently a subject of study. For example, whereas costs can be reduced by lowering the maximum transmit power of terminal devices, or simplifying the reception circuit (such as by receiving with a single antenna instead of receiving with multiple antennas), uplink coverage reduction due to reduced maximum transmit power, and downlink coverage reduction due to reduced gain during reception due to simplification of the reception circuit, are conceivable, and therefore issues under study in relation to coverage enhancement include enhancing these to the normal coverage range. In order to reduce the transmit/receive power and enhance coverage, it is conceivable for the base station device to repeatedly transmit downlink data or a downlink signal to the MTCUE, and for the MTCUE to repeatedly transmit uplink data or an uplink signal to the base station device. Such repeated transmission includes transmission of the same data with a different redundancy version in the HARQ process, transmission with the same redundancy version, repeated transmission of the control channel in multiple subframes, and the like. Such novel functions (reduction in the maximum bandwidth, repeated transmission, and the like) merely specify the type of terminal device, and application thereof is not limited to MTC.

For example, the base station device repeatedly transmits, to the MTCUE, the physical broadcast channel PBCH multiple times within 40 ms. Furthermore, the base station device repeatedly transmits, multiple times to the MTCUE, the physical downlink shared channel PDSCH, the physical downlink control channel PDCCH, the enhanced physical control channel EPDCCH, and the like. The MTCUE repeatedly transmits, multiple times to MTCUE, the physical uplink shared channel PUSCH, the physical uplink control channel PUCCH, and the like. In the random access procedure, the MTCUE repeatedly transmits the same random access preamble, using radio resources of multiple random access channels PRACHs. Having received the random access preamble, the base station device repeatedly transmits a random access response message. The message 3 and a contention resolution message are repeatedly transmitted as well.

Such a configuration in which repeatedly-transmitted data is repeatedly received and the received pieces of data are composited allows coverage to be enhanced. Furthermore, the amount of coverage enhancement (CE) required differs depending on the arrangement and distance between the terminal device and the base station device, which requires that the number of repetitions (or a parameter corresponding to the number of repetitions (also termed the repetition level or cell enhancement level)) be appropriately configured for each terminal device (or each physical channel used by terminal devices).

For this reason, a configuration is under study in which the base station device notifies MTCUE within a cell of the number of repetitions using the broadcast channel BCH, or individually notifies MTCUE of the number of repetitions (NPL 3).

For example, notification of the number of transmission repetitions of random access preamble or the number of reception repetitions of random access response message is made using the broadcast channel BCH. Another configuration is under study in which multiple different numbers of transmission repetitions of random access preamble are defined, and the MTCUE is allowed to select one from among the multiple different numbers of transmission repetitions.

Repetition control for physical downlink control channel PDCCH reception, enhanced physical control channel EPDCCH reception, physical uplink control channel PUCCH transmission, and physical random access channel PRACH (or random access preamble) transmission is called physical repetition (PHY repetition), and repetition control for physical downlink shared channel PDSCH reception and physical uplink shared channel PUSCH transmission is called bundling.

When the bundling is configured, the bundle size provides the number of subframes of a single bundle. The bundling operation relies on a HARQ entity for invoking the same HARQ process for each transmission that is part of the same bundle. Within a single bundle, HARQ retransmissions are non-adaptive and triggered without waiting for feedback from previous transmissions according to the bundle size. HARQ feedback of a single bundle is received (PUSCH HARQ-ACK) or transmitted (PDSCH HARQ-ACK) by a terminal device, for only the last subframe of the bundle. The bundling process takes place in the MAC layer.

Transmission of system information to be broadcast is performed periodically at the RRC layer level. In transmission of each system information, HARQ retransmission takes place in the MAC layer. Repetition control for physical downlink control channel PDCCH reception, enhanced physical control channel EPDCCH reception, physical uplink control channel PUCCH transmission, and physical random access channel PRACH (or random access preamble) transmission takes place in the PHY layer.

Furthermore, the base station device 3 may configure multiple different numbers of repetitions and configure respective repetition levels or bundling sizes. For example, with three repetition levels configured, when the repetition level is 1, the number of repetitions is set to 10; when the repetition level is 2, the number of repetitions is set to 20; and when the repetition level is 3, the number of repetitions is set to 30. At this time, different numbers of repetitions may be set for respective channels. The base station device 3 may be configured to individually notify the terminal device 1-1 of the repetition levels or bundling sizes.

A dedicated downlink control channel for the MTCUE (MPDCCH) may be defined. In this case, the MPDCCH may fulfill some or all of the roles of the above-described PDCCH and EPDCCH for the MTCUE.

In light of the foregoing, preferred embodiments of the present invention will be described in detail below, with reference to the appended drawings. Note that in the descriptions of the embodiments of the present invention, when it is determined that detailed descriptions of widely-known functions and configurations related to the embodiments of the present invention make the gist of the embodiments of the present invention unclear, the detailed descriptions will be omitted.

First Embodiment

A first embodiment of the present invention will be described below.

Figure 1:
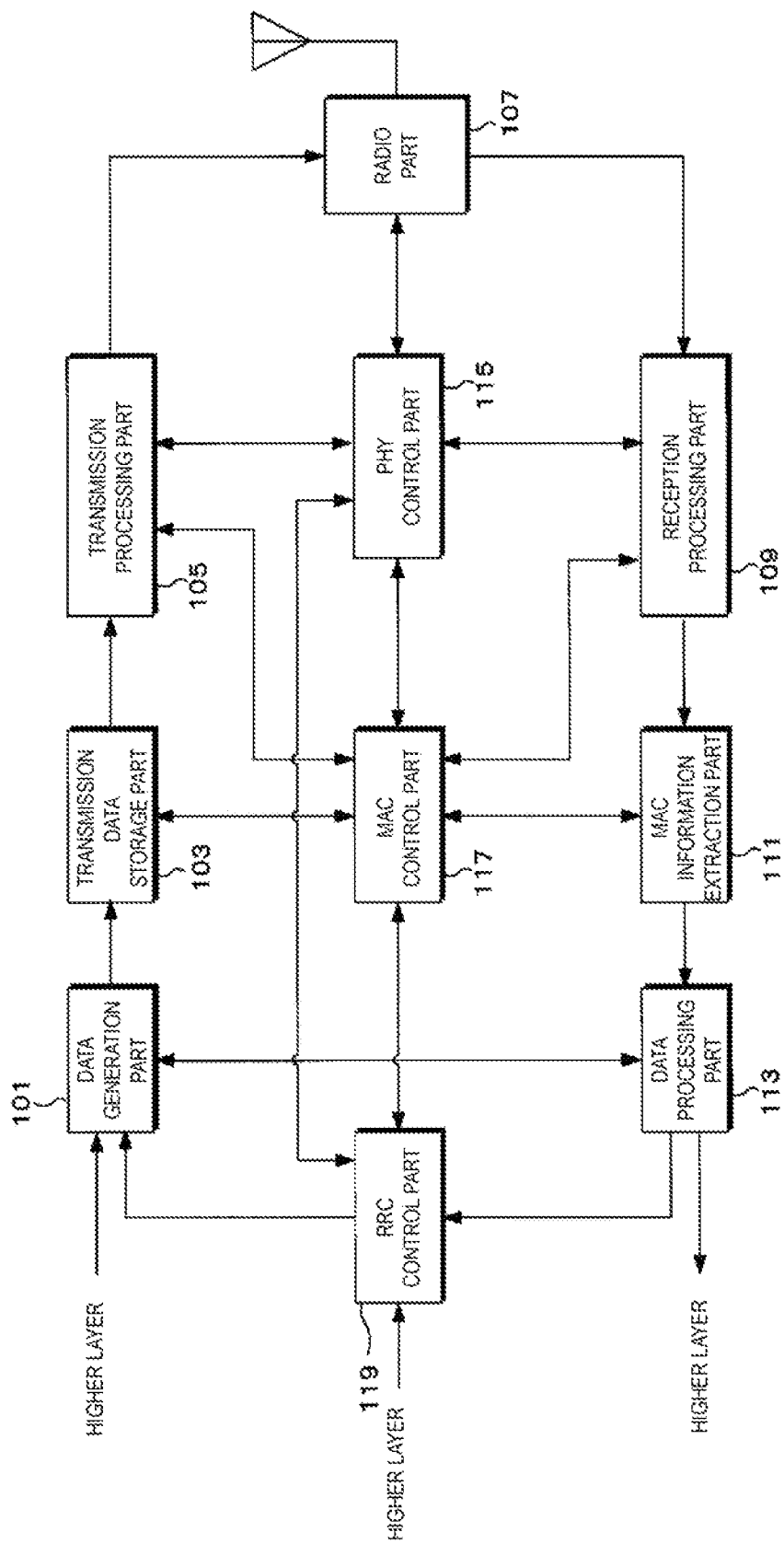
FIG. 1 is a diagram illustrating an example of a configuration of a terminal device according to an embodiment of the present invention.

FIG. 1 is a diagram illustrating a configuration of a terminal device according to the embodiment of the present invention. Terminal devices 1-1 to 1-3 are each constituted of a data generation part 101, a transmission data storage part 103, a transmission processing part 105, a radio part 107, a reception processing part 109, a MAC information extraction part 111, a data processing part 113, a PHY control part (physical layer control part) 115, a MAC control part (medium access control part) 117, and an RRC control part (radio resource control part) 119. In FIG. 1, "part" refers to an element for implementing the function and procedure of the terminal device 1, and may also be referred to as "section," "circuit," "constituent device," "device," or "unit."

User data from the higher layer and control data from the RRC control part 119 are input to the data generation part 101. The data generation part 101 has functions of the PDCP layer and the RLC layer. The data generation part 101 performs processes such as user data IP packet header compression, data encryption, and segmentation and concatenation of data, and adjusts the data size. The data generation part 101 outputs the processed data to the transmission data storage part 103.

The transmission data storage part 103 accumulates the data input from the data generation part 101, and in accordance with an instruction from the MAC control part 117, outputs the specified data to the transmission process part 105 by the specified data volume. The transmission data storage part 103 also outputs information regarding the volume of accumulated data to the MAC control part 117.

The transmission processing part 105 codes the data input from the transmission data storage part 103, and performs a puncture process on the coded data. The transmission processing part 105 modulates and codes the punctured data. The transmission processing part 105 then performs discrete Fourier transform (DFT)-inverse fast Fourier transform (IFFT) on the modulated and coded data, and thereafter inserts a cyclic prefix (CP), maps the CP-inserted data on the physical uplink shared channel (PUSCH) of each component carrier (cell) in the uplink, and outputs the data to the radio part 107.

Upon having received a response instruction to received data from the PHY control part 115, the transmission processing part 105 generates an ACK or a NACK signal, maps the generated signal on the physical uplink control channel (PUCCH), and outputs the signal to the radio part 107. Upon having received a transmission instruction for random access preamble from the PHY control part 115, the transmission processing part 105 generates a random access preamble, maps the generated signal on the physical random access channel PRACH, and outputs the signal to the radio part 107.

The radio part 107 upconverts the data input from the transmission processing part 105 to a radio frequency of transmission position information (transmission cell information) instructed by the PHY control part 115, adjusts the transmit power, and transmits the data from a transmit antenna. The radio part 107 downcoverts radio signals received via a receive antenna, and outputs the signals to the reception processing part 109. The radio part 107 configures the transmission timing information received from the PHY control part 115 as the uplink transmission timing.

The reception processing part 109 performs a fast Fourier transform (FFT) process, decoding, a demodulation process, and the like on the signals input from the radio part 107. The reception processing part 109 demodulates the physical downlink control channel PDCCH or the enhanced physical downlink control channel EPDCCH. Upon detection of downlink assignment information for the own terminal device, the reception processing part 109 demodulates the physical downlink shared channel PDSCH on the basis of the downlink assignment information, and outputs, to the MAC control part 117, the notice of receipt of the downlink assignment information. Furthermore, during the aforementioned process, the reception processing part 109 may perform processing in such a way as to composite multiple input signals on the basis of the number of repetitions instructed by the PHY control part 115.

The reception processing part 109 decodes the demodulated physical downlink shared channel PDSCH data. Upon succeeding in decoding the data, the reception processing part 109 outputs the data to the MAC information extraction part 111. The reception processing part 109 demodulates the physical downlink control channel PDCCH or the enhanced physical downlink control channel EPDCCH. Upon detection of uplink transmission permission information (an uplink grant) or response information on uplink transmission data (ACK/NACK), the reception processing part 109 outputs the acquired response information to the MAC control part 117. Note that the uplink transmission permission information includes data modulation and coding schemes, data size information, HARQ information, transmission position information, and the like. Furthermore, the reception processing part 109 notifies the MAC control part 117 of the success or failure in decoding the input data.

Furthermore, the reception processing part 109 may measure downlink reference signal received power (RSRP), the downlink reference signal being known sequence signal, and report the measurement result to the RRC control part 119 via the PHY control part 115. When doing so, the reception processing part 109 may change the measurement period in accordance with the number of reception repetitions (repetition level, bundling size) configured by the PHY control part 115. The information on the measurement period configured in accordance with the number of repetitions may be formed of predefined combinations or may be notified or broadcast by means of an RRC message from the base station device 3.

The MAC information extraction part 111 extracts the medium access control layer (MAC layer) control data from data input from the reception processing part 109, and outputs the extracted MAC control information to the MAC control part 117. The MAC information extraction part 111 outputs the remaining data to the data processing part 113. The data processing part 113 has functions of the PDCP layer and the RLC layer, and performs processing, such as an expansion (decompression) function for compressed IP headers, a decoding function for coded data, and segmentation and concatenation of data, to restore the data to the original form thereof. The data processing part 113 divides the data into a RRC message and user data, and then outputs the RRC message to the RRC control part 119 and the user data to the higher layer.

In accordance with instructions from the MAC control part 117, the PHY control part 115 controls the transmission processing part 105, the radio part 107, and the reception processing part 109. From the modulation and coding schemes, transmit power information, and transmission position information (transmission cell information) notified by the MAC control part 117, the PHY control part 115 notifies the transmission processing part 105 of the modulation and coding schemes and the transmission position, and notifies the radio part 107 of the transmission cell frequency information and transmit power information. Furthermore, in accordance with instructions from the MAC control part 117, the PHY control part 115 performs ON/OFF control on power (power supply) of the transmission processing part 105, the radio part 107, and the reception processing part 109. The ON/OFF control refers to power-saving control, including bringing the power supply down to standby power.

A control signal specifying the number of uplink and/or downlink repetitions is input to the PHY control part 115 from any one of the reception processing part 109, the MAC control part 117, and the RRC control part 119.

The MAC control part 117 has functions of the MAC layer, and controls the MAC layer on the basis of information acquired from the RRC control part 119, the lower layer, and the like. On the basis of the data transmission control configuration specified by the RRC control part 119, data volume information acquired from the transmission data storage part 103, and uplink transmission permission information acquired from the reception processing part 109, the MAC control part 117 determines a data transmission destination and a data transmission priority order, and notifies the transmission data storage part 103 of information relating to data to be transmitted. The MAC control part 117 also outputs the modulation and coding schemes and transmission position information (transmission cell information) to the PHY control part 115.

The MAC control part 117 acquires transmission timing timer information from the RRC control part 119. Using the transmission timing timer, the MAC control part 117 manages the valid/invalid status of the uplink transmission timing. The MAC control part 117 outputs, to the PHY control part 115, transmission timing information which is included in a transmission timing message in MAC control information input from the MAC information extraction part 111. Upon having configured a transmission timing, the MAC control part 117 starts or restarts the transmission timing timer.

The MAC control part 117 creates a buffer status report (BSR), which is information about the amount of data accumulated in the transmission data storage part 103, and outputs the report to the transmission data storage part 103. The MAC control part 117 also creates a power headroom report (PHR), which is transmit power information, and outputs the report to the transmission data storage part 103.

When configuration information on the number of repetitions (first information) is included in a random access response message input from the MAC information extraction part 111, the MAC control part 117 may notify the PHY control part 115, on the basis of the first information, of a configuration for the number of transmission repetitions of the message 3; and even when information on the number of repetitions (second information) notified by the RRC control part 119 is present, the MAC control part 117 may notify the PHY control part 115, on the basis of the first information, of a configuration for the number of reception repetitions of the contention resolution message. Furthermore, the configuration information on the number of repetitions may be notified to the RRC control part 119.

A control signal specifying the number of uplink and/or downlink repetitions may be input to the MAC control part 117 from the MAC information extraction part 111 and/or the RRC control part 119. Furthermore, the MAC control part 117 may output the information on the number of repetitions to the PHY control part 115.

The RRC control part 119 performs various configurations for communications with the base station device 3, such as processes of connecting with/disconnecting from the base station device 3, and data transmission control configuration for control data and user data. The RRC control part 119 exchanges information with the higher layer in association with the various configurations, and control the lower layer in association with the various configurations.

The RRC control part 119 creates an RRC message, and outputs the created RRC message to the data generation part 101. The RRC control part 119 analyzes the RRC message input from the data processing part 113. The RRC control part 119 creates a message indicating the transmission capability of the own terminal device, and outputs the message to the data generation part 101. Furthermore, the RRC control part 119 also outputs information necessary for the MAC layer to the MAC control part 117, and outputs information necessary for the physical layer to the PHY control part 115.

Upon having acquired transmission timing timer information, the RRC control part 119 outputs the transmission timing timer information to the MAC control part 117. Upon having been notified of the release of the physical uplink control channel PUCCH or uplink sounding reference signal from the MAC control part 117, the RRC control part 119 releases the assigned physical uplink control channel PUCCH and uplink sounding reference signal, and instructs the PHY control part 115 to release the physical uplink control channel PUCCH and the uplink sounding reference signal.

Information specifying the number of uplink and/or downlink receptions may be input to the RRC control part 119 from the data processing part 113. Furthermore, the RRC control part 119 may output the information on the number of repetitions to the MAC control part 117 and/or the PHY control part 115.

On the basis of information on the received power (RSRP) reported by the reception processing part 109 and information notified or broadcast by means of an RRC message from the base station device 3, the RRC control part 119 may derive the number of repetitions to be configured for the own terminal device and/or to be notified (or reported, or requested) to the base station device 3. In this case, the RRC control part 119 may output the information on the number of repetitions to the MAC control part 117 and/or the PHY control part 115. The information on the number of repetitions may be information that is configured for each physical channel, or information that is configured for only some of the physical channels.

On the basis of the information on the number of receptions input from the RRC control part 119, the MAC control part 117 and/or the PHY control part 115 may configure the number of transmission repetitions and/or the number of reception repetitions for the own terminal device. The number of repetitions may be configured on a channel-by-channel basis.

Note that the transmission processing part 105, the radio part 107, the reception processing part 109, and the PHY control part 115 perform physical layer operations, the transmission data storage part 103, the MAC information extraction part 111, and the MAC control part 117 perform MAC layer operations, the data generation part 101 and the data processing part 113 perform RLC layer and PDCP layer operations, and the RRC control part 119 performs RRC layer operations. One or multiple control parts may be constituted of some or all of the PHY control part 115, the MAC control part 117, and the RRC control part 119.

In FIG. 1, other constituent elements of the terminal device 1, and data (control information) transmission paths between constituent elements have been omitted, but it is obvious that the terminal device 1 includes, as constituent elements thereof, multiple blocks having other functions necessary for operating as the terminal device 1. For example, a non access stratum (NAS) layer part and an application layer part are present above the RRC control part 119.

Figure 2:
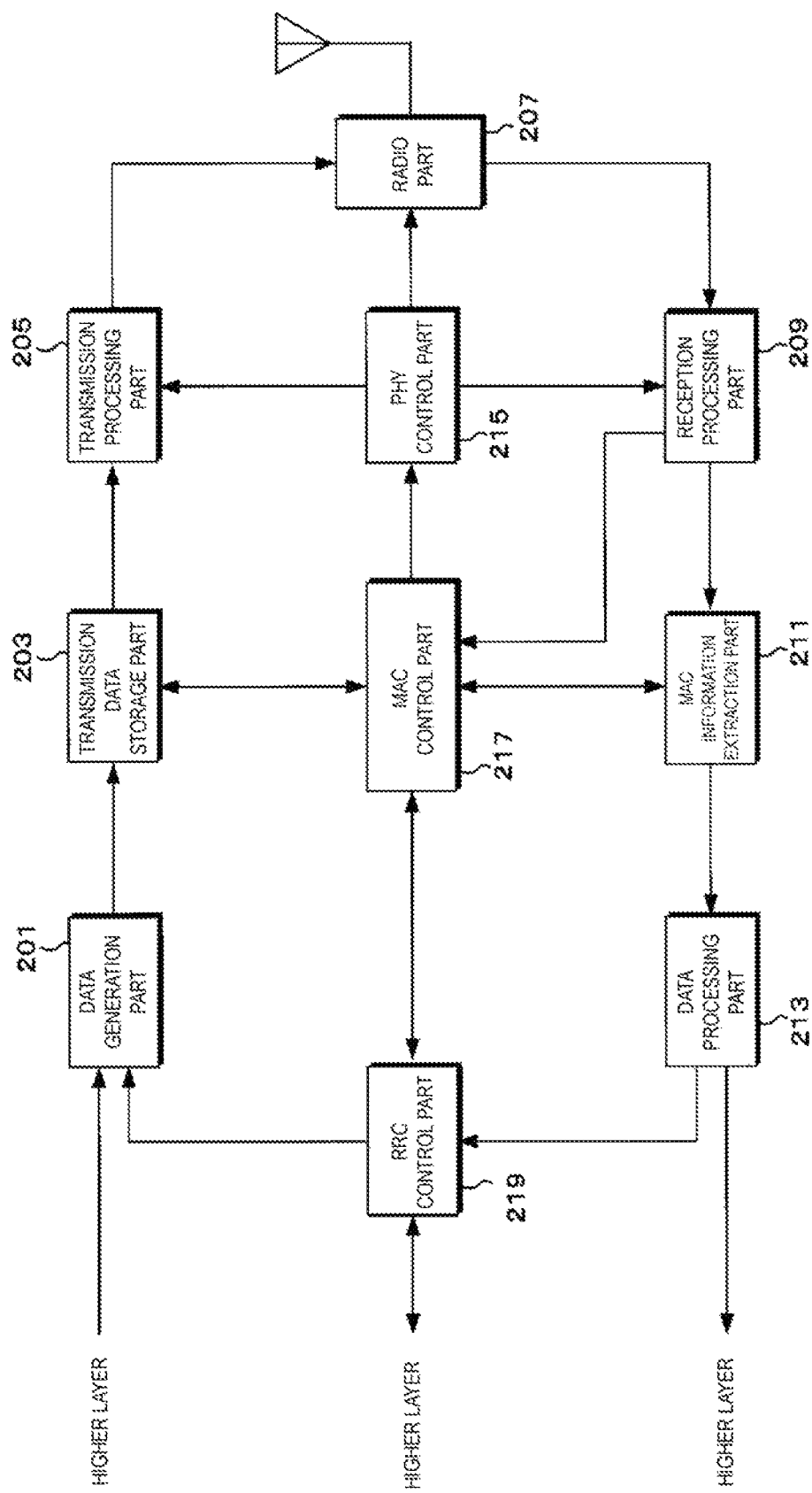
FIG. 2 is a diagram illustrating an example of a configuration of a base station device according to the embodiment of the present invention.

FIG. 2 is a diagram illustrating a configuration of the base station device according to the embodiment of the present invention. The base station device 3 is constituted of a data generation part 201, a transmission data storage part 203, a transmission processing part 205, a radio part 207, a reception processing part 209, a MAC information extraction part 211, a data processing part 213, a PHY control part 215, a MAC control part 217, and an RRC control part 219. In FIG. 2, "part" refers to an element for implementing the function and procedure of the base station device 3, and may also be referred to as "section," "circuit," "constituent device," "device," or "unit."

The data generation part 201 has functions of the PDCP layer and the RLC layer; performs processes such as user data IP packet header compression, data encoding, and segmentation and concatenation of data; and adjusts the data size. The data generation part 201 outputs the processed data and logical channel information on the data to the transmission data storage part 203.

The transmission data storage part 203 accumulates, for each user, the data input from the data generation part 201, and in accordance with an instruction from the MAC control part 217, outputs the specified data to the transmission processing part 205 by the specified data volume. The transmission data storage part 203 also outputs information regarding the volume of accumulated data to the MAC control part 217.

The transmission processing part 205 codes the data input from the transmission data storage part 203, and performs a puncture process on the coded data. Then, the punctured data is modulated and coded. The transmission processing part 205 maps the modulated and coded data to channels and signals of each cell, such as the physical downlink control channel PDCCH, downlink synchronization signal, physical broadcast channel PBCH, and physical downlink shared channel PDSCH, performs OFDM signal processing, such as serial/parallel conversion, inverse fast Fourier transform (IFFT) conversion, CP insertion, and the like, on the mapped data, and generates an OFDM signal.

The transmission processing part 205 then outputs the generated OFDM signal to the radio part 207. Upon having received a response instruction to received data from the MAC control part 217, the transmission processing part 205 generates an ACK or a NACK signal, maps the generated signal on the physical downlink control channel PDCCH, and outputs the signal to the radio part 207.

The radio part 207 upconverts the data input from the transmission processing part 205 to a radio frequency, adjusts the transmit power, and transmits the data from a transmit antenna. The radio part 207 downcoverts radio signals received via a receive antenna, and outputs the signals to the reception processing part 209. The reception processing part 209 performs a fast Fourier transform (FFT) process, coding, a demodulation process, and the like on the signals input from the radio part 207.

The reception processing part 209 decodes the physical uplink shared channel PUSCH data in the demodulated data. Upon succeeding in decoding the data, the reception processing part 209 outputs the data to the MAC information extraction part 211. The reception processing part 209 also outputs, to the MAC control part 217, downlink transmission data response information (ACK/NACK) on control data acquired from the physical uplink control channel PUCCH in the demodulated data, downlink radio quality information (CQI), and uplink transmission request information (scheduling request).

Upon detection of a random access preamble, the reception processing part 209 calculates transmission timing from the detected random access preamble, and outputs the detected random access preamble number and the calculated transmission timing, to the MAC control part 217. The reception processing part 209 calculates the transmission timing from an uplink reference signal, and outputs the calculated transmission timing to the MAC control part 217.

The MAC information extraction part 211 extracts the MAC layer control data from data input from the reception processing part 209, and outputs the extracted control information to the MAC control part 217. The MAC information extraction part 211 outputs the remaining data to the data processing part 213. The data processing part 213 has functions of the PDCP layer and the RLC layer, performs processing, such as an expansion (decompression) function for compressed IP headers, a decoding function for encoded data, and segmentation and concatenation of data, to restore the data to the original form thereof. The data processing part 213 divides the data into an RRC message and user data, and outputs the RRC message to the RRC control part 219, and outputs the user data to the higher layer.

The MAC control part 217 has functions of the MAC layer, and controls the MAC layer on the basis of information acquired from the RRC control part 219, the lower layer, and the like. The MAC control part 217 performs downlink and uplink scheduling processes. The MAC control part 217 performs downlink and uplink scheduling processes on the basis of response information on the downlink transmission data (ACK/NACK), the downlink radio quality information (CQI), and the uplink transmission request information (scheduling request) which have been input from the reception processing part 209, the control information input from the MAC information extraction part 211, and data volume information for each user acquired from the transmission data storage part 203, and the reception operation state of the terminal device 1-1. The MAC control part 217 outputs the scheduling result to the transmission processing part 205.

Upon having acquired a random access preamble number and transmission timing from the reception processing part 209, the MAC control part 217 creates a random access response message, and outputs the random access response message to the transmission data storage part 203. In addition, upon having acquired transmission timing from the reception processing part 209, the MAC control part 217 creates a transmission timing message including the transmission timing, and outputs the transmission timing message to the transmission data storage part 203.

Using the transmission timing timer, the MAC control part 217 manages the uplink transmission timing of the transmission timing group of the terminal device 1-1. Upon having transmitted a transmission timing message of each transmission timing group to the terminal device 1-1, the MAC control part 217 starts or restarts the corresponding transmission timing timer.

The RRC control part 219 performs various configurations for communications with the terminal device 1-1, such as processes of connecting with/disconnecting from the terminal device 1-1, and data transmission control configuration for determining a cell in which the control data and user data of the terminal device 1-1 are transmitted and received; exchanges information with the higher layer in association with the various configurations; and controls the lower layer in association with the various configurations.

The RRC control part 219 creates RRC messages of each type, and outputs the created RRC messages to the data generation part 201. The RRC control part 219 analyzes RRC messages input from the data processing part 213.

Furthermore, the RRC control part 219 also outputs information necessary for the MAC layer to the MAC control part 217, and outputs information necessary for the physical layer to the PHY control part 215. Upon having notified of the release of the physical uplink control channel PUCCH or uplink sounding reference signal from the MAC control part 217, the RRC control part 219 releases the assigned physical uplink control channel PUCCH and uplink sounding reference signal, and instructs the PHY control part 215 to release the physical uplink control channel PUCCH and the uplink sounding reference signal.

In addition, the RRC control part 219 configures information about the number of transmission/reception repetitions (the number of reception repetitions, the number of transmission repetitions), on the basis of a measurement report message from the terminal device 1-1, and/or uplink radio quality information from the reception processing part 209. That is, for each terminal device 1-1, the RRC control part 219 configures the number of reception repetitions for the PDSCH, PDCCH, EPDCCH, MPDCCH, and the like, and the number of transmission repetitions for the physical uplink shared channel PUSCH and physical uplink control channel PUCCH, performed by the terminal device 1-1. The number of transmission/reception repetitions may be configured for each uplink and downlink, or for each physical channel.

The RRC control part 219 creates a repetitive transmission/reception control message including the aforementioned number of transmission/reception repetitions, and outputs the repetitive transmission/reception control message to the transmission data storage part 203. Furthermore, the RRC control part 219 notifies the MAC control part 217 and the PHY control part 215 of the number of reception repetitions and the number of transmission repetitions that have been configured for the terminal devices 1-1. The repetitive transmission/reception control message may be, for example, an RRC reconfiguration message, or a new RRC message. One or multiple control parts may be constituted of some or all of the transmission processing part 205, the radio part 207, the reception processing part 209, the MAC control part 217, and the RRC control part 219.

Note that the transmission processing part 205, the radio part 207, and the reception processing part 209 perform physical layer operations; the transmission data storage part 203, the MAC information extraction part 211, and the MAC control part 217 performs MAC layer operations, the data generation part 201 and the data processing part 213 performs RLC layer and PDCP layer operations, and the RRC control part 219 performs RRC layer operations. In FIG. 2, other constituent elements of the base station device 3, and data (control information) transmission paths among constituent elements have been omitted, but it is obvious that the base station device 3 includes, as constituent elements thereof, multiple blocks having other functions necessary for operating as the base station device 3. For example, a radio resource management part and an application layer part are present above the RRC control part 219.

Terminal devices 1-1 may be classified into two or three types. For example, terminal devices of the first type are terminals classified as category 0 to category 13, or the like. It may also be said that the terminals are not for MTC. Terminals of the second type have a limitation on a support system bandwidth in downlink due to lower in cost. The terminals of the second type include a certain level of coverage enhancement (cell enhancement). The terminals of the second type may be classified as category (−1) or the like. Terminals of the third type are terminals that support coverage enhancement. The terminals of the third type may be classified as category (−2) or the like. That is, the maximum number of repetitions supported by the terminal devices of the second type may be fewer than that supported by the terminal devices of the third type. The functions supported by the respective types differ, and the application of the types need not be limited to MTC. Also, the second type and the third type may be collectively considered as the second type, and distinguished in terms of function from the first type.

Next, in the present embodiment, cell selection performed by the terminal device 1-1 will be described.

The terminal device 1-1 scans, on the basis of the capability thereof, an RF channel of an EUTRA frequency band. At this time, the terminal device 1-1 may scan the RF channel with reference to cell selection information (frequency or cell information) held in the terminal device 1-1. Furthermore, the terminal device 1-1 may attempt cell selection with a fewer number of repetitions. Upon failure in cell selection, the terminal device 1-1 may attempt cell selection with a larger number of repetitions.

The terminal device 1-1 searches for a cell having the largest power in each carrier frequency, and once a suitable cell has been found, selects that cell. Here, the "suitable cell" refers to a certain cell of a selected PLMN, registered PLMN, or PLMN in an equivalent PLMN list, a certain cell in at least one tracking area, the cell being not barred and the tracking area being not included in a list of forbidden tracking areas for roaming, and a cell satisfying a selection criteria discussed below.

Upon having found a cell, the terminal device 1-1 determines, on the basis of information such as the broadcast information or receive power of the cell, whether access to the cell is permitted, and whether the cell selection criteria are satisfied. For example, information indicating whether or not the cell is a barred cell may be included in system information acquirable by the terminal device 1-1 of the first type (e.g., information broadcast with being included in system information block type 1 (SystemInformationBlock-Type1)), or information indicating whether or not the cell is a barred cell for the terminal devices 1-1 (MTCUE) of the second type and third type may be included in new system information for the terminal devices 1-1 of the second type and third type (e.g., information broadcast with being included in system information block type 1A (SystemInformationBlockType1A)).

Additionally, a parameter for determining whether cell selection criteria are satisfied (e.g., the minimum required reception level (Qrxlevmin), the minimum required quality level (Qqualmin), offset added to Qrxlevmin and Qqualmin (Qrxlevminoffset and Qqualminoffset, respectively), or the like) may be included in system information acquirable by the terminal device 1-1 of the first type (e.g., information broadcast with being included in system information block type 1 (SystemInformationBlockType1)), may be included in system information for the terminal devices 1-1 of the second type and third type (e.g., information broadcast with being included in system information block type 1A (SystemInformationBlockType1A)), or may be included in both.

For example, the terminal device 1-1 of the first type may use a parameter included in the SystemInformationBlock-Type1, and the terminal devices 1-1 of the second type and third type may use a new parameter included in the SystemInformationBlockType1A. In this case, the new system information may include an independent parameter for each of the numbers of repetitions (repetition level, cell enhancement level). Furthermore, in this case, all of the parameters may be independent for each of the number of repetitions (repetition level, cell enhancement level), or only some of the parameters may be independent. In addition, only parameters based on the maximum number of repetitions (repetition level, cell enhancement level) supported by the base station device 3 rather than values that are independent for each of the number of repetitions (repetition level, cell enhancement level) may be broadcast to the terminal devices 1-1 of the second type and third type (terminal devices supporting cell enhancement).

From the value obtained by subtracting Qrxlevmin and Qrxlevminoffset from the measured reception level (RSRQ), the terminal device 1-1 subtracts the larger value of 0 decibels and the value obtained by subtracting the maximum RF output power of the terminal device 1-1 from the maximum transmit power level during uplink transmission, to obtain the result as Srxlev.

Furthermore, the terminal device 1-1 takes the value obtained by subtracting Qqualmin and Qqualminoffset from the measured quality level (RSRQ), as Squal.

The terminal device 1-1 takes, as cells satisfying the cell selection criteria, cells having Srxlev greater than zero and Squal greater than zero.

Next, in the present embodiment, cell reselection performed by the terminal device 1-1 will be described. Note that the terminal device 1-1 need not have some or all of cell reselection functions. For example, the terminal device 1-1 may lack a function of reselecting a cell of different frequency, and have only a function of reselecting a cell within the same frequency.

When serving cell (PCell) broadcast information includes information on offset to a neighbor cell, information on offset to a frequency of the neighbor cell, or a hysteresis value for preventing frequent cell reselection, the terminal device 1-1 acquires this information. Next, the terminal device 1-1 calculates a value (Rs) obtained by adding the hysteresis value to the reception level (RSRP) of the serving cell (PCell). The terminal device 1-1 also calculates a value (Rn) obtained by subtracting the offset from the reception level (RSRP) of a neighbor cell(s). The terminal device 1-1 compares the calculated Rs and the Rn of one or more neighbor cells, and selects a cell for reselection.

Note that the terminal device 1-1 may be configured to perform measurement for reselection, when the reception level (RSRP) or quality level (RSRQ) of the serving cell (PCell) is equal to or less than a predetermined threshold value. At this time, the measurement may be performed only when the number of repetitions (repetition level, cell enhancement level) configured for the terminal device 1-1 is equal to the maximum number in the serving cell (PCell); or the measurement may be performed even when the number of repetitions (repetition level, cell enhancement level) configured for the terminal device 1-1 is not equal to the maximum number in the serving cell (PCell), and when no cell to be reselected has not been found, the number of repetitions may be changed by the method described below.

Figure 3:
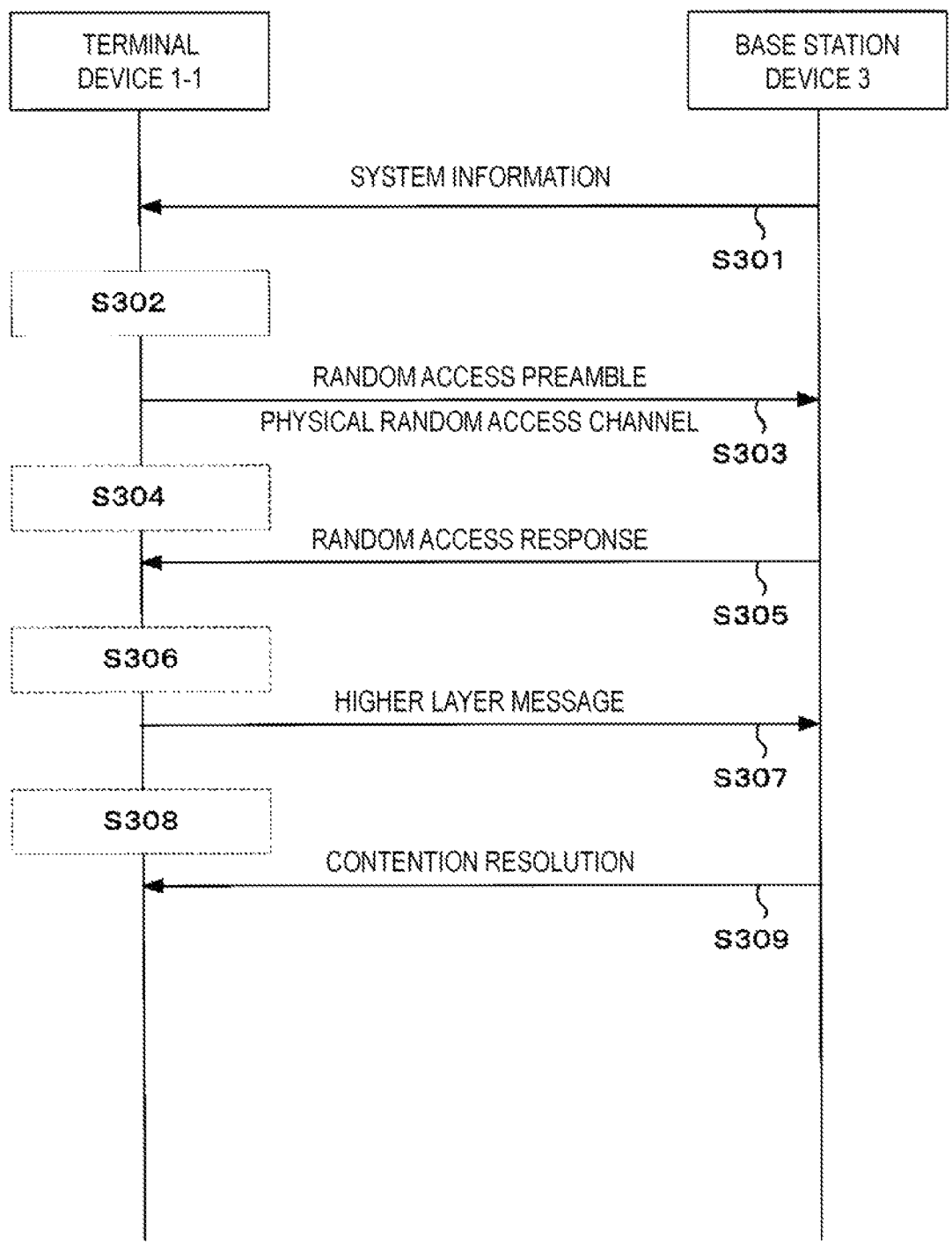
FIG. 3 is a diagram illustrating an example of a sequence chart for configuring the number of transmission repetitions and the number of reception repetitions at the time of an initial random access, according to the embodiment of the present invention.

Next, in the present embodiment, a method of configuring the number of transmission repetitions and the number of reception repetitions at the time of initial random access performed by the terminal device 1-1 will be described with reference to FIG. 3.

First, the terminal device 1-1 acquires system information of the base station device 3 from the physical broadcast channel PBCH or the like (step S301). The system information may be transmitted (broadcast) by a predetermined number of repetitions. Alternatively, only part of the system information may be transmitted (broadcast) by the predetermined number of repetitions, and the other part of the system information excluding the part of the system information may be transmitted (broadcast) by the number of repetitions notified through the part of the system information, the number of repetitions of PDSCH whose system information is included in a downlink control channel (PD-CCH, EPDCCH, MPDCCH, and the like) may be specified, or a combination thereof may also be acceptable.

With the way described above, the terminal device 1-1 acquires information about the number of repetitions, and acquires information relating to the random access procedure included in the system information. The information relating to the random access procedure is constituted of physical random access channel PRACH mapping information, random access preamble generation information, random access preamble selection information, information relating to random access response reception, information relating to message 3 transmission, information relating to contention resolution message reception, and the like.

The terminal device 1-1 selects a random access preamble from the random access preamble selection information (step S302). Using a physical random access channel PRACH resource, the terminal device 1-1 transmits the random access preamble (step S303). Here, the terminal device 1-1 may determine the number of transmission repetitions of the random access preamble on the basis of a path-loss value or the received power (RSRP or the like) of the signal received from the base station device 3; may determine the number on the basis of the number of reception repetitions required for acquiring the PBCH or other system information; may determine the number on the basis of the downlink radio quality and information relating to the number of transmission repetitions acquired from the system information; or may initially start transmission with the minimum number of repetitions, and upon failure in transmission, increase the number of repetitions.

The terminal device 1-1 may perform transmission using a random access preamble and/or PRACH resource that has been associated with the number of transmission repetitions. The random access preamble is transmitted with the same transmit power, up to the number of transmission repetitions for preamble transmission. Note that random access preamble selection information may also be constituted of information relating to a random access preamble selected by a mobile station device, and information relating to a random access preamble selected by the terminal device 1-1.

The base station device 3 detects the random access preamble transmitted from the terminal device 1-1. Here, the base station device 3 may detect, by the number of reception repetitions predefined in the system, the random access preamble transmitted from the terminal device 1-1, or configure the number of reception repetitions on the basis of the random access preamble and/or PRACH resource to be used and detect the random access preamble transmitted from the terminal device 1-1.

The base station device 3 calculates the shift in transmission timing between the terminal device 1-1 and the base station device 3 from the detected random access preamble, performs scheduling (specification of an uplink radio resource position (position of the uplink shared channel PUSCH), a transmission format (message size), and the like) for transmitting a Layer 2 (L2)/Layer 3 (L3) message, assigns a temporary cell-radio network temporary identity (C-RNTI: terminal device identification information), and transmits a random access response message. The base station device 3 may map, on the physical downlink control channel PDCCH, EPDCCH, or MPDCCH, a random access-radio network temporary identity (RA-RNTI: random access response identification information) indicating a response (random access response) addressed to the terminal device 1-1 that has transmitted the random access preamble of the random access channel RACH, and transmits, on the physical downlink shared channel PDSCH, a random access response message including transmission timing information, scheduling information, a temporary C-RNTI, and the received random access preamble information; or transmits a random access response message using a downlink radio resource that has been uniquely associated beforehand with a random access preamble and/or PRACH resource. At this time, the number of transmission repetitions of the random access response message may be specified through the PDCCH, EPDCCH, or MPDCCH on which the RA-RNTI is mapped, may be a predetermined number of repetitions, or may be the number of repetitions associated with the detected random access preamble and/or PRACH resource. The random access response message is repeatedly transmitted on the physical downlink shared channel PDSCH.

The terminal device 1-1 receives the random access response message and verifies the content thereof (step S305). At this time, the number of reception repetitions of the random access response message may be specified through the PDCCH, EPDCCH, or MPDCCH on which the RA-RNTI is mapped, may be a predetermined number of repetitions, or may be the number of repetitions associated with the random access preamble and/or PRACH resource that has been last transmitted by the terminal device itself in step S304. Furthermore, the terminal device 1-1 may receive the physical downlink shared channel PDSCH in a downlink resource region uniquely associated with the random access preamble and/or with a physical random access channel resource (mapping information), and detect a random access response message.

When a random access response message includes information about the transmitted random access preamble, the terminal device 1-1 adjusts the uplink transmission timing on the basis of the transmission timing information, and transmits an L2/L3 message that includes information identifying the terminal device 1-1, such as the C-RNTI (or temporary C-RNTI), an international mobile subscriber identity (IMSI), or the like, with the scheduled radio resource and transmission format (step S307). At this time, the number of transmission repetitions for transmission of this message, which is configured in step S306, may be a predetermined number of repetitions, may be the number of repetitions specified in the random access response message, or may be the number of repetitions equal to that of the random access preamble last transmitted by the device itself. The terminal device 1-1 repeatedly transmits the message 3 up to the configured number of transmission repetitions.

Furthermore, when the transmission timing has been adjusted, the terminal device 1-1 starts the transmission timing timer.

Upon receiving the L2/L3 message from the terminal device 1-1, the base station device 3, using the C-RNTI (or temporary C-RNTI) or the IMSI included in the received L2/L3 message, transmits, to the terminal device 1-1, a contention resolution message for determining whether contention (collision) is occurring among terminal devices 1-1 to 1-3. The number of transmission repetitions of the contention resolution message may be specified through the PDCCH, EPDCCH, or MPDCCH on which is mapped the C-RNTI indicating that the information is addressed to the terminal device 1-1; may be a predetermined number of repetitions; may be the number of repetitions associated with the random access preamble and/or PRACH resource; may be the number of repetitions equal to that of the random access response message; or may be the number of repetitions configured for the terminal device 1-1 in the random access response message.

The terminal device 1-1 receives the contention resolution message (step S309). At this time, the number of reception repetitions of the contention resolution message, which is configured in step S308, may be specified through the PDCCH, EPDCCH, or MPDCCH on which is mapped the C-RNTI indicating that information is addressed to the terminal device itself; may be a predetermined number of repetitions; may be the number of repetitions associated with the random access preamble and/or PRACH resource; may be configured to be the number of repetitions equal to that of the random access response message; or may be configured to be the number of repetitions configured in the random access response message.

Note that when a random access response message that includes a preamble number corresponding to the random access preamble transmitted by the configured number of transmission repetitions has not been detected within a specified period of time, transmission of the message 3 has failed, or identification information on the terminal device 1-1 itself has not been detected in the contention resolution message within a specified period of time, the terminal device 1-1 starts the process over from transmission of the random access preamble. When doing so, the number of repetitions of the random access preamble may be increased. Then, when the number of transmissions of the random access preamble has exceeded the maximum number of transmissions of the random access preamble indicated by the system information, the terminal device 1-1 determines that the random access has failed.

The number of transmission repetitions of the physical uplink shared channel PUSCH or the number of reception repetitions of the physical downlink shared channel PDSCH after completion of the random access procedure may be configured to correspond to the random access preamble. Furthermore, the number of transmission repetitions or reception repetitions after completion of the random access procedure may be individually notified to the terminal device 1-1 through the system information. Notification may also be made via the random access response message or contention resolution message of the random access procedure described earlier. For example, the information about the number of transmission repetitions and reception repetitions for each channel may be defined as a plurality of sets, or may be broadcast from the base station device 3 as the system information, and the information indicating which set the terminal device 1-1 employs may correspond to the random access preamble used (the number of transmission repetitions of the random access preamble), may be notified through the random access response message or contention resolution message, may be notified through another RRC message or MAC control element as a separate configuration, or may be a combination thereof.

Next, a method of changing the number of repetitions with the terminal device 1-1 in an RRC connected state will be described.

As the method of changing the number of repetitions, one conceivable method involves the base station device 3 notifying of a change in the number of repetitions, on the basis of a report from the terminal device 1-1.

For example, the base station device 3 may configure the number of repetitions for uplink or the number of repetitions for downlink with respect to the terminal device 1-1 on the basis of the power of a signal received from the terminal device 1-1, or the measurement result of the downlink channel state information (CQI), downlink reference signal received power (RSRP) and received quality (RSRQ), or the like that are notified by the terminal device 1-1, and notify the terminal device 1-1 of this number. In the method of notification to the terminal device 1-1, notification may be made through a message in the RRC layer (e.g., an RRC connection re-establishment message or a new RRC message), notification may be made through control information in the MAC layer (a MAC control element), or notification may be made in the form of downlink control information or uplink control information in the PHY layer. The terminal device 1-1 may run a timer at a specific measurement report timing triggered when the received quality or received power of the serving cell (PCell) is lower than a threshold value, and when the number of repetitions satisfying a condition has not been configured by the base station device 3 before the timer expires, initiate a connection re-establishment procedure, or transition to an idle state. This configuration causes the timer to stop upon the number of repetitions satisfying the condition having been configured before the timer expires.

As another method, a method in which the terminal device 1-1 changes the number of repetitions (and/or notifies the base station device 3) on the basis of the state thereof is conceivable.

For example, upon failing to transmit and/or receive with the number of repetitions configured in the terminal device 1-1 (when a greater number of repetitions is required), the terminal device 1-1 regards, on the basis of a configuration condition of the number of repetitions which has been configured or notified in advance, the event as a radio link failure at the point in time of change in the number of repetitions (preferably only in cases of change to a greater number of repetitions), and attempts to reconfigure the RRC connection.

Furthermore, for example, upon failing to transmit and/or receive using the number of repetitions configured in the terminal device 1-1 (when a greater number of repetitions is required), the terminal device 1-1 may transition, on the basis of a configuration condition of the number of repetitions which has been configured or notified in advance, to an idle state at the point in time of change in the number of repetitions (preferably only in cases of change to a greater number of repetitions). Upon having data for transmission therein, having received paging, performing location registration, or the like, the terminal device 1-1 may start from the initial random access procedure, in order to establish an RRC connection.

Furthermore, for example, on the basis of the measurement result of the received level (RSRP) of the serving cell (PCell), the received level, and a configuration condition of the number of repetitions which has been configured or notified in advance, the terminal device 1-1 may make notification (or request) of a change in the number of repetitions (repetition level, cell enhancement level) by the random access procedure described below, at the point in time of change in the number of repetitions (preferably only in cases of change to a greater number of repetitions).

The terminal device 1-1 may configure the period for performing measurement of the reference signal received power (RSRP) as described above such that the period differs depending on the number of repetitions (repetition level, cell enhancement level). For example, the terminal device 1-1 may configure the period for measurement of the same frequency as that of the serving cell (PCell) to be 200 ms when the number of repetitions is zero (state of no cell enhancement), and then increase the measurement period from 200 ms as the number of repetitions (repetition level, cell enhancement level) increases. The measurement period at the time of cell enhancement may be one for which the period is predefined to correspond to the number of repetitions; the period may be derived from the number of repetitions by a computational expression; or the period may be notified and configured through broadcast information or an individual RRC message to the terminal device 1-1.

The terminal device 1-1 may perform radio link monitoring (RLM) in order to detect reception failure such as that described above. The radio link monitoring performed by the terminal device 1-1 will be described below.

For the radio link monitoring in the terminal device 1-1, the PHY control part 115 notifies, on the basis of information such as the reference signal received power measured by the reception processing part 109, the higher layer (the RRC control part 119) of an "out-of-sync" condition when it is estimated that the radio link quality of the serving cell (PCell) is continuously equal to or less than a specific threshold value (Qout) for longer than a specific period (e.g., $T_{Evaluate}\ Q_{out}$=200 ms). The PHY control part 115 also notifies, on the basis of information such as the reference signal received power measured by the reception processing part 109, the higher layer (the RRC control part 119) of an "in-sync" condition when it is estimated that the radio link quality of the serving cell (PCell) is continuously equal to or greater than a specific threshold value (Qin) for longer than a specific period (e.g., $T_{Evaluate}\ Q_{in}$=100 ms). It is preferable that the PHY control part 115 notify the higher layer of the out-of-sync or in-sync condition at specific intervals (e.g., $T_{Report\ sync}$=10 ms).

Here, for example, the threshold value Qout is defined as the level at which the downlink radio link cannot be reliably received and shall correspond to 10% block error rate of a hypothetical downlink control channel transmission based on previously defined parameters (or, in cases in which the terminal device 1-1 is a terminal of a specific type (e.g., a second type or third type), transmission that includes (takes into account) the repeated transmission (bundling size) configured in the terminal device 1-1). Furthermore, for example, the threshold value Qin is defined as the level at which the downlink radio link quality can be significantly more reliably received than in the Qout state and shall correspond to 2% block error rate of a hypothetical downlink control channel transmission based on previously defined parameters (or, in cases in which the terminal device 1-1 is a terminal of a specific type (e.g., a second type or third type), transmission that includes (takes into account) the repeated transmission (bundling size) configured in the terminal device 1-1).

When out-of-sync conditions have been consecutively received a predetermined number of times (N310 times), the higher layer (the RCC control part 119) starts or restarts the running of the timer (T310). When in-sync conditions have been consecutively received a predetermined number of times (N311 times), the RCC control part 119 stops the running of the timer (T310). When the running of the timer (T310) has expired without stopping, the RRC control part 119 may transition to an idle state, or perform an RRC connection re-establishment procedure.

The foregoing is an example of a case in which DRX has not been configured in the terminal device 1-1, but when DRX has been configured in the terminal device 1-1, the RRC control part 119 may configure the period for measuring radio link quality, or the interval of notification to the higher layer, so that these have different values than when DRX has not been configured. Even when DRX has been configured and the aforementioned timer (T310) is running, the period for measuring radio link quality for estimating the in-sync condition, or the interval of notification to the higher layer may be the same values as when DRX has not been configured.

Some or all of the parameters of timer (T310), threshold values (Qin, Qout), number of times (N310, N311), periods ($T_{Evaluate}\,Q_{out}$, $T_{Evaluate}\,Q_{in}$), or interval ($T_{Report\,sync}$) may be values that are configured individually for each of the number of repetitions (repetition level, cell enhancement level), or other values corresponding to cell enhancement. The values may be predetermined values; may be broadcast by the base station device 3 through broadcast information which is system information directed to a terminal device of a certain type for example; may be individually configured for the terminal device 1-1 through an RRC message or the like; or may be a combination thereof.

For parameters such as timers, threshold values, number of times, and the like, different values for the same parameter may be configured for terminal devices of a certain type, and terminal devices of other types. When doing so, values may be selected from alternatives that differ between terminal devices of a certain type, and terminal devices of other types. For example, as the range of values that can be assumed by a timer such as T310, a range of 0 ms to 2000 ms can be selected for terminal devices not compatible with cell expansion, and a range of 0 ms to T ms (T>2000) can be selected for terminal devices compatible with cell expansion. By so doing, it is possible to introduce terminal devices compatible with cell expansion while reducing the effects on existing procedures.

For parameters such as timers, threshold values, number of times, and the like, values may be configured for new parameters which are independent of the parameters of terminal devices not compatible with cell enhancement, and when doing so, the values can be selected from alternatives having different value ranges with respect to the independent parameters.

This enables the terminal device 1-1 to acquire new system information, different from system information for terminal devices of the first type (terminal devices not compatible with cell enhancement), from broadcast information that is directed to terminal devices of the second type and third type (terminal devices compatible with cell enhancement), and perform appropriate radio link monitoring, by configuring radio link monitoring parameters according to the number of repetitions (repetition level, cell expansion level) of the terminal device 1-1.

On the basis of parameters and the values thereof, the terminal device 1-1 may also derive the number of repetitions that brings the terminal device 1-1 into in-sync.

On the basis of the radio link monitoring and the like discussed above, when a reception fails (when an out-of-sync condition is notified a predetermined number of times, when the timer T310 has expired, or the like), the terminal device 1-1 may notify the base station device 3 of the change in the number of repetitions (or of the need for a change in the number of repetitions) by carrying out random access as described below.

Figure 4:
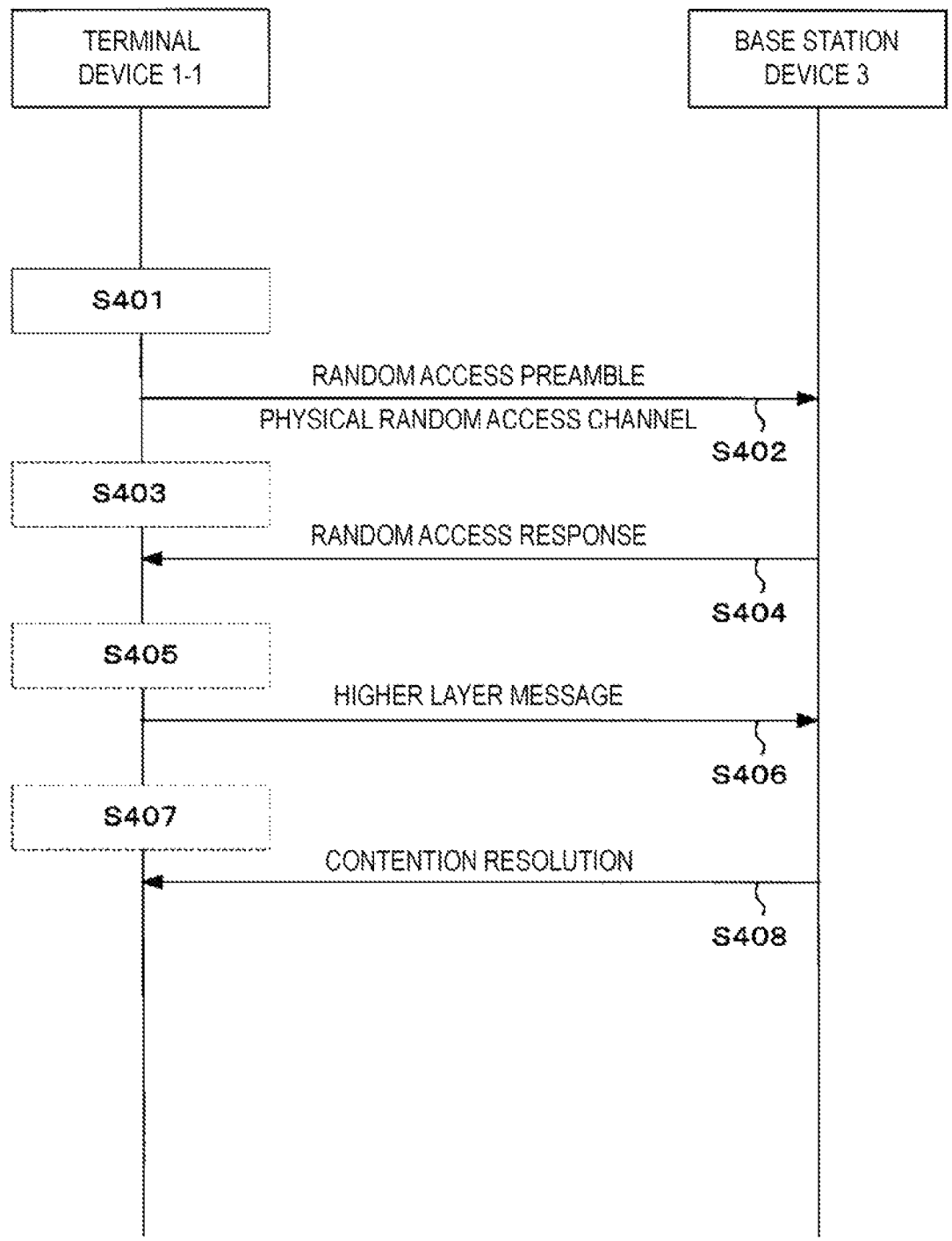
FIG. 4 is a diagram illustrating an example of a sequence chart for configuring the number of repetitions in a random access procedure, according to a first embodiment of the present invention.

An example of a method of configuring the number of repetitions when a random access procedure is to be performed in the RRC connected state will be described with reference to FIG. 4.

The terminal device 1-1 may be configured to hold information in which the number of repetitions and threshold values for received power or received quality are associated with each other as predetermined information, or acquire such information from the base station device 3 as an RRC layer message. For example, the information may take the form of a table constituted of multiple numbers of transmission and reception repetitions, and threshold values for downlink reference signal received power (RSRP) or received quality (RSRQ) associated with the numbers of repetitions; or the form of a table constituted of the number of repetitions, and threshold values of block error rate (BLER) associated with the numbers of repetitions. Alternatively, the terminal device 1-1 may hold one or more sets of information indicating the number of repetitions, either as a predetermined configuration or a configuration notified through an RRC layer message from the base station device 3; and further, information indicating which number of repetitions is valid (an index uniquely corresponding to information indicating the number of repetitions, or the like) may be notified to the terminal device 1-1 from the base station device 3, in the form of an RRC layer message, as a MAC layer control element, or as downlink control information of the physical layer. The numbers of repetitions may be configured independently for each physical channel in the tables and information.

When there has been a change in the number of repetitions on the basis of information, data demodulation has failed during a fixed time period (or a fixed number of times), or the like, the terminal device 1-1 notifies (or reports) the change in the number of repetitions to the base station device 3, through random access. When the number of repetitions changes in the decreasing direction, the current number of repetitions may be maintained until a new configuration is made by the base station device 3. That is, the terminal device 1-1 may make notification to the base station device 3 only when the number of repetitions changes in the increasing direction.

In order to make notification to the base station device 3, the MAC control part 117 may release the PUCCH resource that has been assigned to the terminal device itself, may notify the RRC layer of the release of the PUCCH resource, or may stop the TA timer. That is, the MAC control part 117 may bring the system into a state in which uplink transmission other than random access preamble transmission does not take place, and notify the base station device 3 of a change in the number of repetitions (or a re-configured number of repetitions) through a random access procedure. Also, when the TA timer has stopped or expired, the terminal device 1-1 may release the configuration of the number of transmission repetitions (or the index information indicating which number of transmission repetitions) configured therein.

From random access-related information included in the system information or in information configured individually for the terminal device 1-1, the terminal device 1-1 generates a random access preamble (step S401). Using the random access channel PRACH resource, the terminal device 1-1 then transmits the random access preamble (step S402). Here, the terminal device 1-1 may employ, as the number of transmission repetitions of the random access preamble, the number of repetitions already configured therein; or when the configuration of the number of transmission repetitions configured in the terminal device 1-1 has been released, may determine the number of transmission repetitions of the random access preamble from the measured value, such as the path-loss value or received power (RSRP or the like) of a signal received from the base station device 3, and from a threshold value associated with the number of repetitions; or may employ a predetermined number of repetitions.

The terminal device 1-1 may acquire (derive) information about the number of repetitions by using the way described above, and transmit the same using a PRACH resource and/or a random access preamble associated with the number of repetitions at the time of transmission.

The base station device 3 detects the random access preamble transmitted from the terminal device 1-1. Here, the base station device 3 may detect the random access preamble transmitted from the terminal device 1-1 by using the number of reception repetitions predefined in the system, or may configure the number of reception repetitions with the random access preamble and/or PRACH resource used, and detect the random access preamble from the terminal device 1-1.

The base station device 3 calculates the shift in transmission timing between the terminal device 1-1 and the base station device 3 from the detected random access preamble, performs scheduling (specification of an uplink radio resource position (position of the physical uplink shared channel PUSCH), a transmission format (message size), and the like) for transmitting a Layer 2 (L2)/Layer 3 (L3) message, assigns a temporary cell-radio network temporary identity (C-RNTI: terminal device identification information), and transmits a random access response message. The base station device 3 may map, on the physical downlink control channel PDCCH, EPDCCH, or MPDCCH, a random access-radio network temporary identity (RA-RNTI: random access response identification information) indicating a response (random access response) addressed to the terminal device 1-1 that has transmitted the random access preamble on the random access channel RACH, and transmit, on the physical downlink shared channel PDSCH, a random access response message including transmission timing information, scheduling information, a temporary C-RNTI, and the received random access preamble information; or may transmit a random access response message with a physical downlink shared channel PDSCH radio resource that has been associated beforehand with a random access preamble and/or PRACH resource. At this time, the number of transmission repetitions of the random access response message may be specified through the PDCCH, EPDCCH, or MPDCCH on which the RA-RNTI is mapped, may be a predetermined number of repetitions, or may be the number of repetitions associated with the detected random access preamble and/or PRACH resource. Also, when the random access procedure is a non-contention based random access procedure, the base station device 3 may configure the number of transmission repetitions to be the number of transmission repetitions configured in the terminal device 1-1.

The terminal device 1-1 receives the random access response message and verifies the content thereof (step S404). At this time, the number of reception repetitions of the random access response message may be specified through the PDCCH, EPDCCH, or MPDCCH on which the RA-RNTI is mapped, may be a predetermined number of repetitions, or may be the number of repetitions associated with the random access preamble and/or PRACH resource last transmitted by the terminal device itself in step S403. Also, when the random access procedure is a non-contention based random access procedure, the terminal device 1-1 may configure the number of reception repetitions of the random access response message to be the number of reception repetitions configured therein.

Additionally, when the configuration information on the number of repetitions has been included in the random access response message, the terminal device 1-1 may overwrite the configuration of the number of repetitions configured therein, with the received configuration information. Alternatively, when the configuration information on the number of repetitions has been included in the random access response message, the terminal device 1-1 may discard or ignore the configuration of the number of repetitions configured therein, and use the received configuration information.

When a random access response message includes information about the transmitted random access preamble, the terminal device 1-1 adjusts the uplink transmission timing on the basis of the transmission timing information, and transmits an L2/L3 message that includes information identifying the terminal device 1-1, such as the C-RNTI (or temporary C-RNTI), the international mobile subscriber identity (IMSI), or the like, using the scheduled radio resource and transmission format (step S406). At this time, the number of transmission repetitions for transmission of this message, which is configured in step S405, may be a predetermined number of repetitions, may be the number of repetitions specified in the random access response, or may be the number of repetitions equal to that of the random access preamble last transmitted by the terminal device itself.

When the transmission timing has been adjusted, the terminal device 1-1 starts a transmission timing timer.

Upon receiving the L2/L3 message from the terminal device 1-1, the base station device 3, using the C-RNTI (or temporary C-RNTI) or the IMSI included in the received L2/L3 message, transmits, to the terminal device 1-1, a contention resolution message for determining whether contention (collision) is occurring among terminal devices 1-1 to 1-3. The number of transmission repetitions of the contention resolution message may be a predetermined number of repetitions, may be the number of repetitions associated with the random access preamble and/or PRACH resource, or may be the same number of repetitions as the random access response message. Furthermore, an RRC message for re-configuring the number of repetitions may be included in the contention resolution message. The information on the number of repetitions may be specified through the PDCCH, EPDCCH, or MPDCCH on which the C-RNTI indicating that the information is addressed to the terminal device 1-1 is mapped.

The terminal device 1-1 receives the contention resolution message (step S408). The number of reception repetitions of the contention resolution message may be specified through the PDCCH, EPDCCH, or MPDCCH on which is mapped the C-RNTI indicating that information is addressed to the terminal device itself; may be a predetermined number of repetitions; may be configured to be the number of repetitions associated with the random access preamble and/or PRACH resource in step S407; or may be configured to be the same number of repetitions as the random access response message. Additionally, when some or all of the RRC message for re-configuring the number of repetitions is included in the contention resolution message, the terminal device 1-1 may overwrite the number of repetitions configured therein, with the received configuration information.

Note that when a random access response message that includes a preamble number corresponding to the transmitted random access preamble has not been detected within a specified period of time, when transmission of the message 3 has failed, or when identification information on the terminal device 1-1 has not been detected in the contention resolution message within a specified period of time, the terminal device 1-1 starts the process over from transmission of a random access preamble. When doing so, the number of repetitions of the random access preamble may be increased. Also, when doing so, the configuration of the number of repetitions that is configured in the terminal device itself may be released.

Then, when the number of transmissions of the random access preamble has exceeded the maximum number of transmissions of the random access preamble indicated by the system information, the terminal device 1-1 determines that the random access has failed, and terminates communication with the base station device 3.

When, for example, the random access procedure is performed in a state in which the number of transmission repetitions and/or the number of reception repetitions has been configured in the terminal device 1-1 from the base station device 3 through an RRC message or the like, the above configuration allows the configuration of the number of repetitions to be released prior to transmission of the random access preamble and the terminal device 1-1 to configure and use a new number of repetitions. By so doing, when the state of communication has degraded, and even in a state in which a reception signal cannot be received from the base station device 3, the terminal device 1-1 itself is capable of re-configuring the number of repetitions and notifying the change in the number of repetitions to the base station device 3, and further capable of beginning the random access procedure using a predetermined (default, common, or the maximum) number of repetitions, or the number of repetitions based on the measured value of received power or the like, and thus, it is possible to reduce random access failures, and it is further possible to re-configure the number of repetitions by the base station device 3 through the random access procedure.

As another mode, until transmission of the random access preamble or message 3, the terminal device 1-1 is capable of using the number of repetitions configured therein, and then overwriting the configuration with the number of repetitions specified through the random access response or contention resolution message. This configuration allows the terminal device 1-1 to notify the base station device 3 of the change in the number of repetitions, and further allows the base station device 3 to reconfigure the number of repetitions through the random access procedure.

A configuration is made in which the period during which measurement of the terminal device 1-1 is performed can be configured in accordance with the number of repetitions (repetition level or cell enhancement level), which allows appropriate measurements to be performed without relying on the number of repetitions (repetition level or cell enhancement level).

Also, a configuration is made in which a different timer or value of a threshold value can be configured in accordance with the number of repetitions (repetition level or cell enhancement level) for measurement of the terminal device 1-1, which allows appropriate measurements to be performed without relying on the number of repetitions (repetition level or cell enhancement level).

The first embodiment allows the number of repetitions for efficient repetitive transmission (or reception) of data to be configured for the terminal device 1-1.

Second Embodiment

A second embodiment of the present invention will be described below.

In the first embodiment, an example has been illustrated in which the terminal device 1-1 in the RRC connected state re-configures the number of repetitions through the random access procedure. In the present embodiment, an example will be described in which the terminal device 1-1 determines the number of repetitions on the basis of the number of repetitions configured therein, and the number of repetitions indicated in the random access procedure.

In the terminal device 1-1 and the base station device 3 used in the present embodiment, some operations of the MAC control part 117 differ from those in the first embodiment (because operations are added), and therefore description of the other details will be omitted.

In the present embodiment, when the configuration information on the number of repetitions (first information) is included in the random access response message input from the MAC information extraction part 111, the MAC control part 117 may notify, on the basis of the first information, the PHY control part 115 of a configuration of the number of transmission repetitions of the message 3; and when the first information and the information on the number of repetitions notified by the RRC control part 119 (second information) are compared, and the number of repetitions specified in the second information is equal to or greater than the number of repetitions specified in the first information, the MAC control part 117 may notify, on the basis of the second information, the PHY control layer 115 of a configuration of the number of reception repetitions of the contention resolution message. Furthermore, the configuration information on the number of repetitions may be notified to the RRC control part 119.

Figure 5:
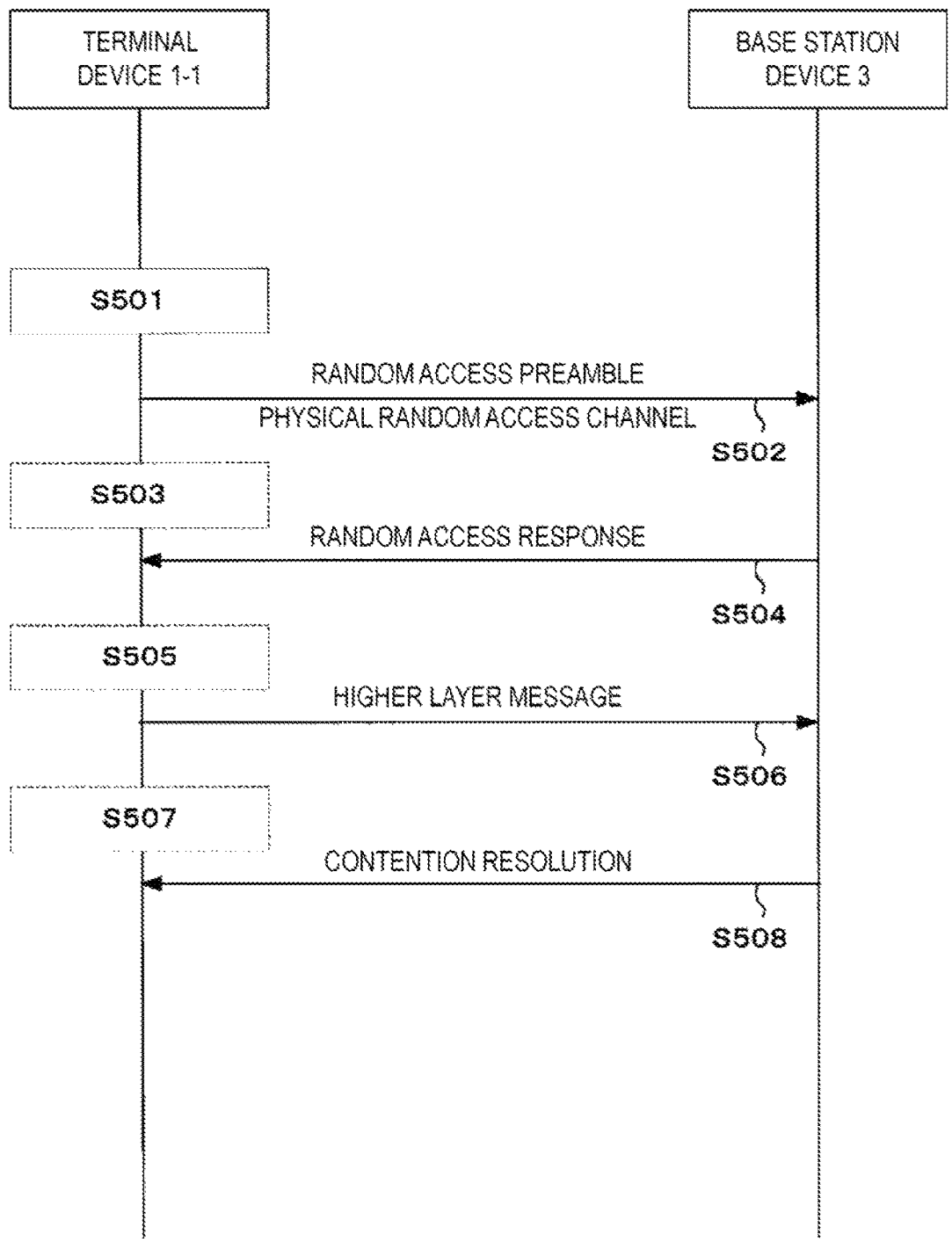
FIG. 5 is a diagram illustrating an example of a sequence chart for configuring the number of repetitions in a random access procedure, according to a second embodiment of the present invention.

In the present embodiment, an example of a method by which the terminal device 1-1 changes the number of repetitions in the case of carrying out a random access procedure in the RRC connected state will be described with reference to FIG. 5.

The terminal device 1-1 may be configured to hold information in which the number of repetitions and threshold values for received power or received quality are associated with each other as predetermined information, or acquire such information from the base station device 3 as an RRC layer message. For example, the information may take the form of a table constituted of multiple numbers of transmission and reception repetitions, and threshold values for downlink reference signal received power (RSRP) or received quality (RSRQ) associated with the numbers of repetitions; or the form of a table constituted of the number of repetitions, and threshold values of block error rate (BLER) associated with the numbers of repetitions. Alternatively, the terminal device 1-1 may hold one or more sets of information indicating the number of repetitions, either as a predetermined configuration or a configuration notified through an RRC layer message from the base station device 3; and further, information indicating which number of repetitions is valid (an index uniquely corresponding to information indicating the number of repetitions, or the like) may be notified to the terminal device 1-1 from the base station device 3, in the form of an RRC layer message, as a MAC layer control element, or as downlink control information of the physical layer. The numbers of repetitions may be configured independently for each physical channel in the tables and information.

When there has been a change in the number of repetitions on the basis of information, data demodulation has failed during a fixed time period (or a fixed number of times), or the like, the terminal device 1-1 notifies (or reports) the change in the number of repetitions to the base station device 3, through random access. When the number of repetitions changes in the decreasing direction, the current number of repetitions may be maintained until a new configuration is made by the base station device 3. That is, the terminal device 1-1 may make notification to the base station device 3 only when the number of repetitions changes in the increasing direction.

In order to make notification to the base station device 3, the MAC control part 117 may release the PUCCH resource that has been assigned to the terminal device itself, or may stop the TA timer. That is, the MAC control part 117 may bring the system into a state in which uplink transmission other than random access preamble transmission does not take place, and notify the base station device 3 of a change in the number of repetitions through a random access procedure. Also, when the TA timer has stopped or expired, the terminal device 1-1 may release the configuration of the number of transmission repetitions (or the index information indicating which number of transmission repetitions) configured therein.

From random access-related information included in the system information, or in information configured individually for the terminal device 1-1, the terminal device 1-1 generates a random access preamble (step S501). Using the random access channel PRACH resource, the terminal device 1-1 then transmits the random access preamble (step S502). Here, the terminal device 1-1 may employ, as the number of transmission repetitions of the random access preamble, the number of repetitions already configured therein; or when the configuration of the number of transmission repetitions configured in the terminal device itself has been released, may determine the number of transmission repetitions of the random access preamble from the measured value, such as the path-loss value or received power (RSRP or the like) of a signal received from the base station device 3, and from a threshold value associated with the number of repetitions; or may employ a predetermined number of repetitions.

The terminal device 1-1 may acquire (derive) information about the number of repetitions by using the way described above, to transmit the same using a PRACH resource and/or a random access preamble associated with the number of repetitions at the time of transmission.

The base station device 3 detects the random access preamble transmitted from the terminal device 1-1. Here, the base station device 3 may detect the random access preamble transmitted from the terminal device 1-1 by using the number of reception repetitions predefined in the system, or may configure the number of reception repetitions with the random access preamble and/or PRACH resource used, and detect the random access preamble from the terminal device 1-1.

The base station device 3 calculates the shift in transmission timing between the terminal device 1-1 and the base station device 3 from the detected random access preamble, performs scheduling (specification of an uplink radio resource position (position of the uplink shared channel PUSCH), a transmission format (message size), and the like) for transmitting a Layer 2 (L2)/Layer 3 (L3) message, assigns a temporary cell-radio network temporary identity (C-RNTI: terminal device identification information), and transmits a random access response message. The base station device 3 may map, on the physical downlink control channel PDCCH, EPDCCH, or MPDCCH, a random access-radio network temporary identity (RA-RNTI: random access response identification information) indicating a response (random access response) addressed to the terminal device 1-1 that has transmitted the random access preamble on the random access channel RACH, and transmit, on the physical downlink shared channel PDSCH, a random access response message including transmission timing information, scheduling information, a temporary C-RNTI, and the received random access preamble information; or may transmit a random access response message with a physical downlink shared channel PDSCH radio resource that has been associated beforehand with a random access preamble and/or PRACH resource. At this time, the number of transmission repetitions of the random access response message may be specified through the PDCCH, EPDCCH, or MPDCCH on which the RA-RNTI is mapped, may be a predetermined number of repetitions, or may be the number of repetitions associated with the detected random access preamble and/or PRACH resource. Also, when the random access procedure is a non-contention based random access procedure, the base station device 3 may configure the number of transmission repetitions to be the number of transmission repetitions configured in the terminal device 1-1.

The terminal device 1-1 receives the random access response message and verifies the content thereof (step S504). At this time, the number of reception repetitions of the random access response message may be specified through the PDCCH, EPDCCH, or MPDCCH on which the RA-RNTI is mapped, may be a predetermined number of repetitions, or may be the number of repetitions associated with the random access preamble and/or PRACH resource last transmitted by the terminal device itself in step S503. Also, when the random access procedure is a non-contention based random access procedure, the terminal device 1-1 may configure the number of repetitions for receiving the PDCCH, EPDCCH, or MPDCCH on which the RA-RNTI is mapped, or the number of repetitions for receiving the PDSCH (random access response message), to be the number of reception repetitions configured therein. On the other hand, when the random access procedure is a contention based random access procedure, the terminal device 1-1 may invalidate the configured number of repetitions, even when the number of repetitions for receiving the PDCCH, EPDCCH, or MPDCCH on which the RA-RNTI is mapped, or the number of repetitions for receiving the PDSCH (random access response message), has been configured in the terminal device itself.

When the configuration information on the number of repetitions is included in the random access response message, the terminal device 1-1 may overwrite the configuration of the number of repetitions configured therein, with the received configuration information.

When a random access response message includes information about the transmitted random access preamble, the terminal device 1-1 adjusts the uplink transmission timing on the basis of the transmission timing information, and transmits an L2/L3 message that includes information identifying the terminal device 1-1, such as the C-RNTI (or temporary C-RNTI), the international mobile subscriber identity (IMSI), or the like, using the scheduled radio resource and transmission format (step S506). At this time, the number of transmission repetitions for transmitting this message, which is configured in step S505, may be the configured number of repetitions when the number of transmission repetitions has been configured in the terminal device itself; or may be a predetermined number of repetitions, or the number of repetitions equal to that of the random access preamble last transmitted by the device itself when the number of transmission repetitions has not been configured in the terminal device itself.

When the transmission timing has been adjusted, the terminal device 1-1 starts a transmission timing timer.

Upon receiving the L2/L3 message from the terminal device 1-1, the base station device 3, using the C-RNTI (or temporary C-RNTI) or the IMSI included in the received L2/L3 message, transmits, to the terminal device 1-1, a contention resolution message for determining whether contention (collision) is occurring among terminal devices 1-1 to 1-3. The number of transmission repetitions of the contention resolution message may be the number of repetitions configured in the terminal device 1-1 by the base terminal device 3 through an RRC message or the like; may be a predetermined number of repetitions, may be the number of repetitions associated with the random access preamble and/or PRACH resource: or may be the same number of repetitions as the random access response message. Furthermore, an RRC message for re-configuring the number of repetitions may be included in the contention resolution message. The information on the number of repetitions may be specified through the PDCCH, EPDCCH, or MPDCCH on which the C-RNTI indicating that the information is addressed to the terminal device 1-1 is mapped.

When the configuration information on the number of repetitions is included in the contention resolution message, the terminal device 1-1 may overwrite the configuration of the number of repetitions configured therein, with the received configuration information. Here, when the random access procedure is a contention based random access procedure and when the number of repetitions configured in the terminal device 1-1 differs from the number of repetitions specified in the contention resolution message, the terminal device 1-1 may select the number of repetitions specified in the contention resolution message.

The terminal device 1-1 receives the contention resolution message (step S508). The number of reception repetitions of the contention resolution message may be specified through the PDCCH, EPDCCH, or MPDCCH on which is mapped the C-RNTI indicating that information is addressed to the terminal device itself; may be a predetermined number of repetitions; may be configured to be the number of repetitions associated with the random access preamble and/or PRACH resource in step S507; or may be configured to be the same number of repetitions as the random access response message. When an RRC message for re-configuring the number of repetitions is included in the contention resolution message, the terminal device 1-1 overwrites the number of repetitions configured therein, with the received configuration information.

Note that when a random access response message that includes a preamble number corresponding to the transmitted random access preamble has not been detected within a specified period of time, when transmission of the message 3 has failed, or when identification information on the terminal device 1-1 itself has not been detected in the contention resolution message within a specified period of time, the terminal device 1-1 starts the process over from transmission of a random access preamble. When doing so, the number of repetitions of the random access preamble may be increased. Also, when doing so, the configuration of the number of repetitions that is configured in the terminal device itself may be released.

Then, when the number of transmissions of the random access preamble has exceeded the maximum number of transmissions of the random access preamble indicated by the system information, the terminal device 1-1 determines that the random access has failed, and terminates communication with the base station device 3.

When, for example, the random access procedure is performed in a state in which the number of transmission repetitions and/or the number of reception repetitions has been configured in the terminal device 1-1 from the base station device 3 through an RRC message or the like, the above configuration allows the number of repetitions based on the random access preamble or the predetermined configuration to be used for the reception of random access response messages, and allows the number of repetitions configured in the terminal device itself to be used for the reception of contention resolution messages. This enables the terminal device 1-1 to perform an efficient random access procedure on the basis of the required number of repetitions.

Furthermore, a configuration is made in which the bundling size of the physical channel (e.g., the PDSCH) can be changed to a different size only in specific cases (e.g., a random access response in a contention based random access procedure) can prevent inconsistency from arising between the configuration of the number of repetitions in the terminal device 1-1, and the configuration information held by the base station device 3.

The second embodiment allows the number of repetitions for efficient repetitive transmission (or reception) of data to be configured for the terminal device 1-1 through the random access procedure.

In the preceding embodiments, the functions of the base station device 3 may be implemented by other devices. For example, the functions may be implemented by a relay station device wirelessly connected with the base station device 3.

Furthermore, in the preceding embodiments, examples have been illustrated in which the terminal device 1-1 is an MTCUE, as a terminal device of a new (enhanced) type (or category) that lacks numerous functions (features) such as those of an existing LTE or LTE-advanced terminal device, and has only limited functions (features); however, the present invention is not limited these embodiments and can be applied to existing or future terminal devices (including base station devices and communication systems therefor) that are capable of cell enhancement (repetitive transmission/reception).

The embodiments described above are merely exemplary, and can be practiced using various modifications or substitutions as well. For example, it is possible to apply the uplink transmission scheme to communication systems of either the frequency division duplex (FDD) scheme or the time division duplex (TDD) scheme. The names of the various parameters and events illustrated in the embodiments have been designated for convenience in description, and even when designations in actual use and the designations in the embodiments of the present invention differ, the spirit of the invention claimed in the embodiments of the present invention is not affected.

The term "connection" used in the embodiments is not limited exclusively to configurations in which a device and another device are directly connected using a physical circuit, and includes logically-connected configurations, and wirelessly-connected configurations using radio technology.

The terminal devices used in the embodiments may have only one or multiple parts capable of MAC layer functions (MAC entity). When multiple parts capable of MAC layer functions are present, the wording "configured in each terminal device" means that an identical configuration may be applied to all of the multiple parts capable of the MAC layer functions, or different configurations may be individually applied to the parts capable of the MAC layer functions.

The terminal device 1 includes not only mobile station devices of portable type or movable type, but also stationary type or non-movable type electronic devices for indoor/outdoor installation, for example, AV equipment, kitchen appliances, cleaning/laundering appliances, air conditioning equipment, office equipment, vending machines, other lifestyle devices or measuring devices, and in-vehicle devices, as well as wearable devices or healthcare devices which can be worn on the body and have communication functions incorporated therein. The terminal device 1 may be used not just for machine-to-machine communication (Machine Type Communication), but also for person-to-person or person-to-machine communication.

The terminal device 1 is also referred to as a user terminal, a mobile station device, a communication terminal, a mobile, a terminal, user equipment (UE), or a mobile station (MS). The base station device 3 is also referred to as a radio base station device, a base station, a radio base station, a fixed station, a NodeB (NB), an evolved NodeB (eNB), a base transceiver station (BTS), or a base station (BS).

Note that the base station device 3 is referred to as an NB in UMTS set forth in 3GPP specifications, and as an eNB in EUTRA and Advanced EUTRA. Note that in UMTS, EUTRA, and Advanced EUTRA set forth in 3GPP specifications, the terminal device 1 is referred to as UE.

For convenience in description, specific combinations of methods, means, or algorithm steps for implementing the functions of the various parts of the terminal devices 1 and base station device 3, or some of these functions, have been described using functional block diagrams; however, these functions can be embodied directly by software modules executed by hardware or processors, or by a combination thereof.

Where implemented using hardware, in addition to the configurations of the described block diagrams, the terminal devices 1 and the base station device 3 may be configured from power supply devices or batteries for supplying power to the terminal devices 1 and the base station device 3; liquid crystal or other display devices and display driving devices; memory; input/output interfaces and input/output terminals; speakers; and other peripheral devices.

Where implemented using software, the above-described functions may be held or transferred in the form of code or one or more commands on a computer-readable medium. Computer-readable media include both computer recording media and communication media including media that aid in carrying a computer program from one location to another.

Furthermore, the control of the terminal device 1 and base station device 3 may be performed by recording one or more commands or code on a computer-readable recording medium and prompting a computer system to read and execute the one or more commands or code recorded onto the recording medium. Herein, the term "computer system" includes an OS, and hardware such as peripheral devices.

The operations described in the embodiments of the present invention may be realized through programs. Programs that run on the terminal devices 1 and the base station device 3 relating to the embodiments of the present invention are programs for controlling a CPU or the like (programs for prompting the functioning of a computer), so as to realize the functions of the above-described embodiments relating to the embodiments of the present invention. The information handled by these devices is temporarily accumulated in RAM at the time of processing, then stored in various kinds of ROM or HDD, and when needed, read out, revised, or written by the CPU.

In addition to realizing the functions of the above-described embodiments by executing programs, there are also cases where the functions of the embodiments of the present invention are realized by the programs running cooperatively with an operating system, other application programs, or the like in accordance with instructions included in the programs.

The term "computer-readable recording medium" refers to semiconductor media (e.g., RAM, nonvolatile memory cards, and the like), optical recording media (e.g, DVD, MO, MD, CD, BD, and the like), magnetic media (e.g., magnetic tape, flexible disks, and the like), and other such portable media, a disk unit housed in a computer system, and other such memory devices. Furthermore, the term "computer-readable recording medium" is considered to include media dynamically holding a program for short periods of time, such as a communication line used for transmission of a program over a network such as the Internet, or via a communication circuit such as a telephone circuit; or media holding a program for a given time, such as an internal nonvolatile memory of a computer system serving as a server or client in such a case.

Furthermore, the program may be intended to realize some of the functions described above, and may further be capable of realizing the functions described above in combination with a program already recorded in the computer system.

The various function blocks or features of the terminal device 1 and the base station device 3 used in the above-described embodiments may be implemented or executed by an entity designed to execute the functions described herein, such as a general-purpose application processor, a digital signal processor (DSP), an application-specific integrated circuit (ASIC) or any general-purpose application integrated circuit (IC), a field programmable gate array signal (FPGA) or other programmable logic device, a discrete gate or transistor logic, a discrete hardware component, or a combination thereof.

The general-purpose application processor may be a microprocessor, or instead, the processor may be a conventional type of processor, controller, microcontroller, or state machine. The general-purpose application processor, or the circuits mentioned above, may be constituted of digital circuits or analog circuits.

The processor may be implemented by a combination of computing devices. For example, the processor is implemented by a DSP and a microprocessor, multiple microprocessors, one or more microprocessors connected to a DSP core, or a combination of other such configurations.

While the embodiments of the present invention have been described in detail based on specific examples, the spirit of the embodiments and the scope of the claims of the present invention are clearly not limited to these specific examples, and also include various design modifications and the like not departing from the gist of the present invention. In other words, the description herein is for the purpose of exemplary description, and does not impose any limitations on the embodiments of the present invention.

Furthermore, various modifications are possible within the scope of the present invention defined by the claims, and embodiments that are made by suitably combining technical means disclosed according to the different embodiments are also included in the technical scope of the present invention. Configurations in which elements described in the above-described embodiments are replaced with ones having comparable effect are also included in the technical scope of the present invention

DESCRIPTION OF REFERENCE NUMERALS

1, 1-1, 1-2, 1-3 Terminal device
3 Base station device
101, 201 Data generation part
103, 203 Transmission data storage part
105, 205 Transmission processing part
107, 207 Radio part
109, 209 Reception processing part
111, 211 MAC information extraction part
113, 213 Data processing part
115, 215 PHY control part
117, 217 MAC control part
119, 219 RRC control part

The invention claimed is:

1. A terminal device comprising:
reception circuitry configured to receive information indicating a number of transmission repetitions for physical downlink control channel, and
physical layer control circuitry configured to perform radio link monitoring based on a plurality of thresholds each being defined as a level of a downlink radio link,
wherein a value of a first threshold of the plurality of thresholds is defined as a level at which the downlink radio link cannot be reliably received,
a value of a second threshold of the plurality of thresholds is defined as a level at which a downlink radio link quality can be more reliably received than at the first threshold,
each of the value of the first threshold and the value of the second threshold corresponds to a specific block error rate of a physical downlink control channel transmission based on the number of transmission repetitions.

2. A base station device comprising:
radio resource control circuitry configured to generate information indicating a number of transmission repetitions for physical downlink control channel; and
transmission circuitry configured to transmit, to a terminal device, the information indicating the number of transmission repetitions,
wherein the radio link monitoring is performed based on a plurality of thresholds each being defined as a level of a downlink radio link,
a value of a first threshold of the plurality of thresholds is defined as a level at which the downlink radio link cannot be reliably received,
a value of a second threshold of the plurality of thresholds is defined as a level at which a downlink radio link quality can be more reliably received than at the first threshold
each of the value of the first threshold and the value of the second threshold corresponds to a specific block error rate of a physical downlink control channel transmission based on the number of transmission repetitions.

3. A communication method for terminal device, the communication method comprising:
receiving information indicating a number of transmission repetitions for physical downlink control channel, and
performing radio link monitoring based on a plurality of thresholds each being defined as a level of a downlink radio link, wherein
a value of a first threshold of the plurality of thresholds is defined as a level at which the downlink radio link cannot be reliably received,
a value of a second threshold of the plurality of thresholds is defined as a level at which a downlink radio link quality can be more reliably received than at the first threshold
each of the value of the first threshold and the value of the second threshold corresponds to a specific block error rate of a physical downlink control channel transmission based on the number of transmission repetitions.

4. A communication method for a base station device, the communication method comprising:
generating information indicating a number of transmission repetitions for physical downlink control channel; and
transmitting, to a terminal device, the information indicating the number of transmission repetitions, wherein
the radio link monitoring is performed based on a plurality of thresholds each being defined as a level of a downlink radio link,
a value of a first threshold of the plurality of thresholds is defined as a level at which the downlink radio link cannot be reliably received,
a value of a second threshold of the plurality of thresholds is defined as a level at which a downlink radio link quality can be more reliably received than at the first threshold
each of the value of the first threshold and the value of the second threshold corresponds to a specific block error rate of a physical downlink control channel transmission based on the number of transmission repetitions.

* * * * *